US010902209B2

(12) United States Patent
Pienkosz et al.

(10) Patent No.: US 10,902,209 B2
(45) Date of Patent: Jan. 26, 2021

(54) METHOD FOR CONTENT SEARCH AND ELECTRONIC DEVICE THEREFOR

(71) Applicant: Samsung Electronics Co., Ltd., Suwon-si (KR)

(72) Inventors: Maciej Pienkosz, Warsaw (PL); Piotr Andruszkiewicz, Warsaw (PL); Krystyna Monika Chodorowska, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/230,311

(22) Filed: Dec. 21, 2018

(65) Prior Publication Data

US 2019/0197110 A1    Jun. 27, 2019

(30) Foreign Application Priority Data

Dec. 21, 2017    (KR) ........................ 10-2017-0176739

(51) Int. Cl.

| | |
|---|---|
| G10L 15/00 | (2013.01) |
| G10L 15/04 | (2013.01) |
| G06F 40/30 | (2020.01) |
| G06F 16/28 | (2019.01) |
| G06N 3/04 | (2006.01) |
| G06N 3/08 | (2006.01) |
| G06F 16/903 | (2019.01) |
| G06F 16/33 | (2019.01) |
| H04W 4/12 | (2009.01) |

(52) U.S. Cl.
CPC ............ *G06F 40/30* (2020.01); *G06F 16/285* (2019.01); *G06F 16/334* (2019.01); *G06F 16/903* (2019.01); *G06N 3/04* (2013.01); *G06N 3/0445* (2013.01); *G06N 3/0454* (2013.01); *G06N 3/084* (2013.01); *H04W 4/12* (2013.01)

(58) Field of Classification Search
CPC .... G06F 16/285; G06F 16/334; G06F 16/903; G06F 40/30; G06N 3/04; G06N 3/0445; G06N 3/0454; G06N 3/084; H04W 4/12
USPC ........................................................ 704/231
See application file for complete search history.

(56) References Cited

U.S. PATENT DOCUMENTS

| | | |
|---|---|---|
| 6,751,776 B1 | 6/2004 | Gong |
| 7,434,176 B1 | 10/2008 | Froloff |

(Continued)

OTHER PUBLICATIONS

Li T. et al.(2010) "Automatic Musical Pattern Feature Extraction Using Convolutional Neural Network"; Mar. 17-19, 2010, International MultiConference of Engineers and Computer Scientists; Hong Kong.

(Continued)

*Primary Examiner* — Khai N. Nguyen
(74) *Attorney, Agent, or Firm* — Jefferson IP Law, LLP

(57) ABSTRACT

A method for operating a server configured to search for content is provided. The method includes receiving, from an electronic device, a text that is extracted from a message transmitted or received by a messaging application at the electronic device, determining one metric value corresponding to the text from numerical vectors corresponding to meanings of words included in the text, selecting one piece of content corresponding to the text, based on the one metric value and metric values of a plurality of pieces of content, and transmitting information related to the one piece of content to the electronic device.

20 Claims, 22 Drawing Sheets

(56) References Cited

U.S. PATENT DOCUMENTS

| | | | | |
|---|---|---|---|---|
| 7,756,535 | B1* | 7/2010 | Diao | H04L 51/12 |
| | | | | 455/412.1 |
| 8,023,974 | B1* | 9/2011 | Diao | G06K 9/6269 |
| | | | | 455/466 |
| 8,959,037 | B2* | 2/2015 | Raichelgauz | G06F 16/4393 |
| | | | | 706/10 |
| 9,043,196 | B1 | 5/2015 | Leydon et al. | |
| 10,375,241 | B2* | 8/2019 | Miller | H04M 3/2281 |
| 2007/0288432 | A1 | 12/2007 | Weltman et al. | |
| 2008/0114751 | A1 | 5/2008 | Cramer et al. | |
| 2011/0087749 | A1 | 4/2011 | Swink et al. | |
| 2012/0265747 | A1 | 10/2012 | Ramamurthi | |
| 2014/0161356 | A1* | 6/2014 | Tesch | G06K 9/00 |
| | | | | 382/196 |
| 2014/0163957 | A1* | 6/2014 | Tesch | G06F 40/30 |
| | | | | 704/9 |
| 2014/0163980 | A1* | 6/2014 | Tesch | G10L 25/57 |
| | | | | 704/235 |
| 2014/0164506 | A1* | 6/2014 | Tesch | H04L 51/32 |
| | | | | 709/204 |
| 2014/0164507 | A1* | 6/2014 | Tesch | H04L 51/10 |
| | | | | 709/204 |
| 2015/0356508 | A1* | 12/2015 | Gokhale | H04W 4/023 |
| | | | | 705/301 |
| 2017/0161929 | A1 | 6/2017 | Nakata | |
| 2017/0300537 | A1 | 10/2017 | Kim et al. | |
| 2017/0302716 | A1* | 10/2017 | Stiers | G06F 16/9535 |
| 2017/0308291 | A1 | 10/2017 | Luipold | |
| 2018/0091653 | A1* | 3/2018 | Miller | G06N 5/04 |
| 2019/0197110 | A1* | 6/2019 | Pienkosz | G06F 40/30 |

OTHER PUBLICATIONS

Socher, R. et al (2014) "Grounded Compositional Semantics for Finding and Describing Images with Sentences"; Apr. 2014, Stanford University, Computer Science Department, Google Inc.

Tang D. et al. (2013) "Learning Sentence Representation for Emotion Classification on Microblogs"; 2013, Research Center for Social Computing and Information Retrieval, Harbin Institute of Technology, Harbin, China.

Vallet A. And Sakamoto H.(2015): "A Multi-Label Convolutional Neural Network for Automatic Image Annotation", Nov. 2015, Journal of Information Processing, vol. 23 No. 6, pp. 767-775.

Venugopalan T. et al. (2015) "Translating Videos to Natural Language Using Deep Recurrent Neural Networks", Apr. 30, 2015.

Jingdong Wang et al.; "Hashing for Similarity Search: A Survey"; Aug. 14, 2014.

International Search Report dated Mar. 25, 2019, issued in International Patent Application No. PCT/KR2018/016481.

European Search Report dated Oct. 1, 2020, issued in European Application No. 18892875.8.

* cited by examiner

METHOD FOR CONTENT SEARCH AND ELECTRONIC DEVICE THEREFOR

CROSS-REFERENCE TO RELATED APPLICATION(S)

This application is based on and claims priority under 35 U.S.C. § 119(a) of a Korean patent application number 10-2017-0176739, filed on Dec. 21, 2017, in the Korean Intellectual Property Office, the disclosure of which is incorporated by reference herein in its entirety.

BACKGROUND

1. Field

The disclosure relates to an electronic device. More particularly, the disclosure relates to a method for content search and an electronic device therefor.

2. Description of Related Art

An artificial-intelligence (AI) system is a computer system that implements human-level intelligence. Unlike existing rule-based smart systems, AI systems are systems in which a machine learns and judges on its own and becomes smarter. As the AI system is used, the recognition rate thereof improves and a user's taste is understood more accurately, and thus existing rule-based smart systems are gradually being replaced by deep-learning-based AI systems.

The AI technology is configured by machine learning (deep learning) and element technologies that utilize the machine learning.

Machine learning is an algorithm technology that classifies/learns the characteristics of input data by itself. Element technology is a technology that simulates functions, such as recognition and judgment by the human brain, using a machine-learning algorithm, such as deep learning, and is configured for technical fields such as linguistic understanding, visual understanding, reasoning/prediction, knowledge representation, and motion control.

The various fields to which AI technology is applied are as follows. Linguistic understanding is a technique of recognizing and applying/processing human language/characters, and includes natural language processing, machine translation, dialog systems, query responses, speech recognition/synthesis, and the like. Visual understanding is a technique of recognizing and processing an object as human vision, and includes object recognition, object tracking, image search, person recognition, scene understanding, spatial understanding, and image enhancement. Inference prediction is a technique of judging and logically inferring and predicting information, and includes knowledge/probability-based reasoning, optimization prediction, preference-based planning, recommendation, and the like. Knowledge representation is a technique of automating human experience information into knowledge data, and includes knowledge establishment (data generation/classification) and knowledge management (data utilization). Motion control is a technique of controlling the autonomous travel of vehicles and the motion of robots, and includes motion control (navigation, collision, traveling), operation control (behavior control), and the like.

Further, patterns of consumption of content by users have recently been diversified. In addition to consuming media, such as an image, video, and audio, as independent content, consumption patterns associated with other types of content are often seen. Therefore, a content search technique suitable for various content consumption patterns is required.

The above information is presented as background information only to assist with an understanding of the disclosure. No determination has been made, and no assertion is made, as to whether any of the above might be applicable as prior art with regard to the disclosure.

SUMMARY

Embodiments of the disclosure are to address at least the above-mentioned problems and/or disadvantages and to provide at least the advantages described below. Accordingly, an embodiment of the disclosure is to provide a method for efficiently searching for content and an electronic device therefor.

Another embodiment of the disclosure is to provide a method for searching for content matching the context and emotional state of a message and an electronic device therefor.

Another embodiment of the disclosure is to provide a method for determining metric values of content and messages for a matching operation and an electronic device therefor.

Another embodiment of the disclosure is to provide a method for training a combined neural model and an electronic device therefor.

Additional embodiments will be set forth in part in the description which follows and, in part, will be apparent from the description, or may be learned by practice of the presented embodiments.

In accordance with an embodiment of the disclosure, a method of operating a server that searches for content is provided. The method includes receiving, from an electronic device, a text that is extracted from a message transmitted or received by a messaging application at the electronic device, determining one metric value corresponding to the text from numerical vectors corresponding to the meaning of words included in the text, selecting one piece of content corresponding to the text, based on the one metric value and metric values of a plurality of content, and transmitting information related to the one piece of content to the electronic device.

In accordance with another embodiment of the disclosure, a method of operating an electronic device is provided. The method includes transmitting, to a server, information of a text that is extracted from a message transmitted or received by a messaging application, receiving, from the server, information related to at least one content corresponding to the text, the information related to the at least one piece of content being searched by the server based on one metric value determined from numerical vectors corresponding to meanings of words included in a specific text of the text, and displaying the at one piece of content.

In accordance with another embodiment of the disclosure, a server for searching for content is provided. The server includes a communicator configured to transmit and receive a signal, and at least one processor connected to the communicator. The at least one processor is configured to receive, from an electronic device, a text that is extracted from a message transmitted or received by a messaging application at the electronic device, determine one metric value corresponding to the text from numerical vectors corresponding to the meaning of words included in the text, select one piece of content corresponding to the text based on the one metric value and metric values of a plurality of pieces of content, and transmit information related to the one piece of content to the electronic device.

In accordance with another embodiment of the disclosure, an electronic device is provided. The electronic device includes a communicator configured to transmit and receive a signal, a display, and at least one processor connected to the communicator and the display. The at least one processor is configured to transmit, to a server, information of a text specified by a user input, receive, from the server, information related to at least one piece of content corresponding to the text, which is retrieved based on one metric value determined from numerical vectors corresponding to meanings of words included in the text, and control the display to display the at least one piece of content.

A method according to various embodiments of the disclosure and an electronic device therefor can efficiently search for and provide content.

The effects that can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on a hardware-wise approach. However, various embodiments of the disclosure include technology that uses both hardware and software, and thus the various embodiments of the disclosure do not exclude the perspective of software.

Hereinafter, the disclosure relates to a method for efficiently searching for and providing content and an electronic device therefor. Specifically, the disclosure describes a technique for searching for and providing content corresponding to the situation of a conversation conducted through an application executed in an electronic device.

Terms referring to various measurement values used in the following description (e.g., a metric value and representation), terms referring to data calculation/an analysis algorithm, terms referring to a device, terms referring to an element of the device, and the like are illustrated for convenience of explanation. Accordingly, the disclosure is not limited to the following terms, and other terms having the same technical meaning may be used.

Figure 1:
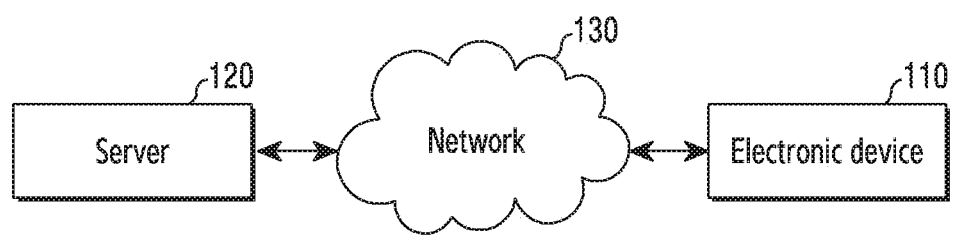
FIG. 1 illustrates a search system according to an embodiment of the disclosure.

FIG. 1 illustrates a search system according to an embodiment of the disclosure. The system illustrated in FIG. 1 may be referred to as a context-sensitive media search (CSMS) system.

Referring to FIG. 1, the system includes an electronic device 110, a server 120, and a network 130.

The electronic device 110 is a computing or processing device used by a user. The electronic device 110 may interact with the server 120 via the network 130. For example, the electronic device 110 may be implemented as one of a cellular phone, a smart phone, a personal digital assistant (PDA), a laptop computer, a tablet computer, and a desktop computer. According to an embodiment, the electronic device 110 may execute at least one application that supports a conversation between users. The conversation between users may take place on any messaging system including a short message service (SMS), e-mail, social media, and a discussion board. While at least one application supporting a conversation is running, the electronic device 110 may search for content to replace or complement a message. In other words, the electronic device 110 may determine, on the basis of a user's determination, whether to search for multimedia matching an emotional state and the context of a message, and may perform search operations. For example, the electronic device 110 may transmit a conversation message transmitted or received via the network 130 to the server 120, may request content, and may receive the content from the server 120. The content received from the server 120 may be displayed on the electronic device 110 so as to replace or complement the conversation message.

The server 120 is a computing or processing device that searches for and provides content in response to a request of the electronic device 110. The server 120 may access the Internet through the network 130 and may periodically update a content database over the Internet. Accordingly, the server 120 may provide various pieces of content. The server 120 may be implemented as a cloud solution. According to an embodiment, the server 120 may provide various types of content matching an emotional state and a context of a conversation message to the electronic device 110. For example, the server 120 analyzes a message transmitted from the electronic device 110 searches for and selects content matching an emotional state and the context of the message on the basis of the analysis result. In this case, the server 120 may propose a plurality of pieces of content, and may select content on the basis of a selection by a user. The server 120 transmits the selected content to the electronic device 110.

The network 130 is used for communication between the server 120 and the electronic device 110. The network 130 may be implemented as a wireless network, a wired network, or a combination thereof. For example, the network 130 may communicate internet protocol (IP) packets, frame relay frames, asynchronous transfer mode (ATM) cells, or other information between network addresses. The network 130 may include one or more local area networks (LANs), metropolitan area networks (MANs), wide area networks (WANs), all or a part of a global network, such as the Internet, or any other communication system or systems in one or more locations.

Although not illustrated in FIG. 1, a system according to various examples may further include a management server that manages information of a user of the electronic device 110. The management server manages subscriber information of a user, and more specifically, the management server may store information of a service level. The server 120 may acquire information of the user from the management server in order to search for content, and may search for content on the basis of the information of the user.

FIG. 1 illustrates an example of a system for media search according to a context, but various changes may be made with respect to FIG. 1. For example, the system may include any number of each element in any suitable arrangement. Generally, computing and communication systems have various elements, and FIG. 1 does not limit the scope of the disclosure to any particular arrangement. FIG. 1 illustrates one operation environment in which various features disclosed herein can be used. However, these features may be used in any other suitable system.

The human eye can deliver a large amount of concentrated information in a short time. Therefore, there is an increasing trend in which a user conveys his or her message by replacing or complementing recorded message texts with other types of content (e.g., an image or a video or audio file). The disclosure proposes a content search service for discovering content matching a recorded message. Various embodiments may rank content searches on the basis of user searches and may prepare a multimedia summary database to facilitate searching for content in a particular domain.

Figure 2:
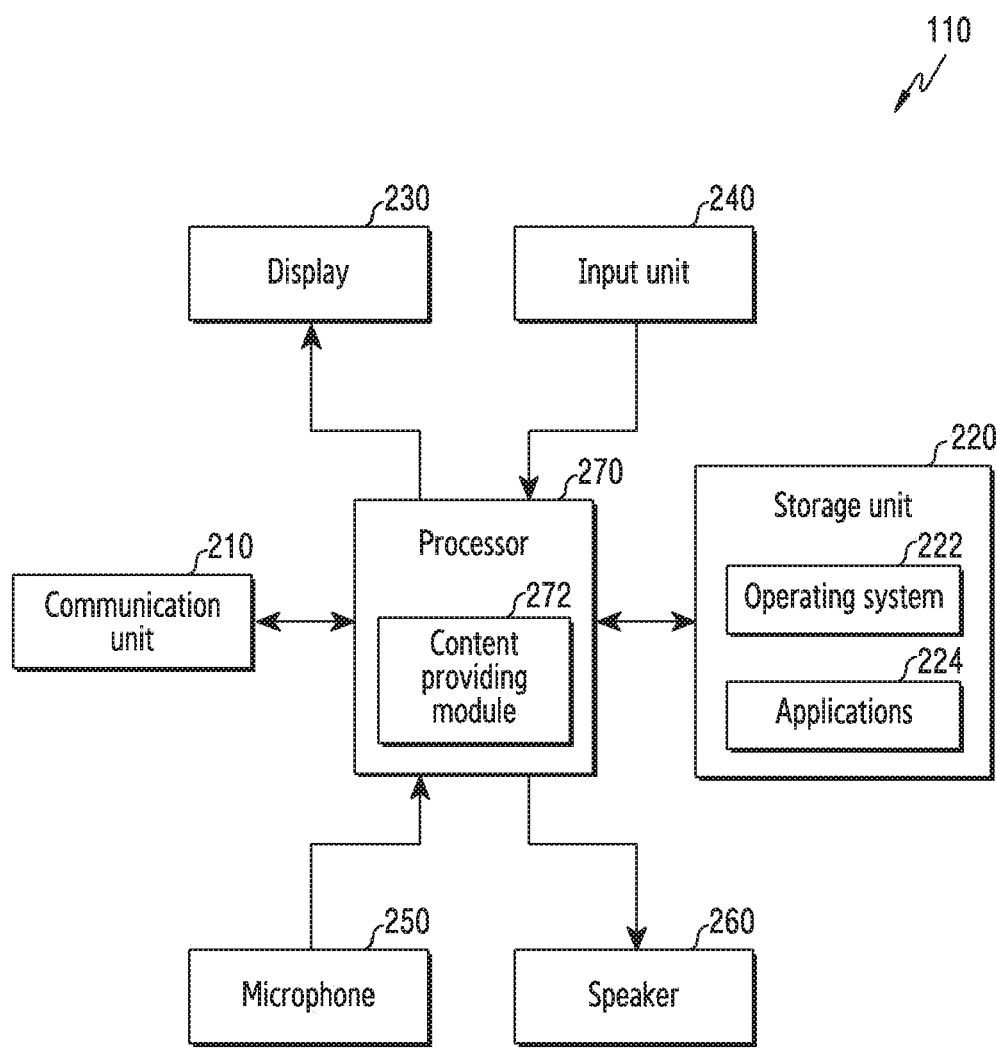
FIG. 2 illustrates a configuration of an electronic device according to an embodiment of the disclosure.

FIG. 2 illustrates a configuration of an electronic device according to an embodiment of the disclosure. The configuration illustrated in FIG. 2 may be understood as the configuration of the electronic device 110. The term "~unit" or "~er" used hereinafter may refer to a unit for processing at least one function or operation, and may be implemented in hardware, software, or a combination of hardware and software.

Referring to FIG. 2, the electronic device may include a communication unit 210, a storage unit 220, a display 230, an input unit 240, a microphone 250, a speaker 260, and a processor 270. According to another embodiment, at least some of the elements illustrated in FIG. 2 may be omitted.

The communication unit 210 provides an interface for communication with other systems or devices. For example, the communication unit 210 may include a network interface card or a wireless transmission/reception unit which enables communication via an external network (e.g., the network 130). For example, the communication unit 210 may perform signal processing for accessing a wireless network. For example, the wireless network may include at least one of a wireless LAN and a cellular network (e.g., long-term evolution (LTE)). The communication unit 210 may be referred to as a "transmission unit," a "reception unit," or a "transmission/reception unit."

The storage unit 220 may store data, such as a basic program for operation of the electronic device, an application, and setting information. The storage unit 220 may be configured as volatile memory, nonvolatile memory, or a combination of volatile memory and nonvolatile memory. The storage unit 220 may provide stored data in response to a request of the processor 270. The storage unit 220 may store an operating system (OS) 222 and at least one application (i.e., at least one of applications 224).

The display 230 performs functions for outputting information in the form of numbers, characters, images, graphics, and the like. To this end, the display 230 may include at least one hardware module for output. For example, the hardware module may include at least one among a liquid crystal display (LCD), a light-emitting diode (LED), a light-emitting polymer display (LPD), an organic light-emitting diode (OLED), an active matrix organic light-emitting diode (AMOLED), and a flexible LED (FLED). The display 230 may display a screen corresponding to data received from the processor 270. The display 230 may be referred to as "an output unit," "a display unit," or other terms having equivalent technical meanings.

The input unit 240 detects inputs from the outside (e.g., a user) and provides the processor 270 with data corresponding to the input. To this end, the input unit 240 may include at least one hardware module for detecting an input. For example, the hardware module may include at least one among a sensor, a keyboard, a keypad, a touch pad, and a touch panel. According to an embodiment, when the input unit 240 is implemented as a touch panel, the input unit 240 may be combined with the display 230 so that a touch screen may be provided. In this case, the input unit 240 may provide data relating to touch input performed by a user (e.g., tap, press, pinch, stretch, slide, swipe, rotate, etc.) to the processor 270.

The microphone 250 may include a circuit, such as a piezoelectric element, and generates an audio signal using vibration of a diaphragm caused by a voice signal input through the microphone 250. The microphone 250 may receive a voice that is input by a user. The microphone 250 may be understood as a part of the input unit 240. The speaker 260 may use the vibration of a diaphragm to convert an audio signal into vibration, and may emit the vibration into the air. The speaker 260 may output a response corresponding to an input message received from a user into an analog form.

The processor 270 may control the overall operation of the electronic device. For example, the processor 270 may transmit and receive a signal through the communication unit 210. Further, the processor 270 may record and read data in the storage unit 220 and execute instructions stored in the storage unit 220. The processor 270 may display various screens through the display 230, and may output an audio signal through the speaker 260. The processor 270 may process data that is input through the input unit 240 and the microphone 250, and may control the operational state of the input unit 240 and the microphone 250 when necessary. The processor 270 may include a single or a plurality of processors. For example, the processor 270 may be implemented as at least one among microprocessors, microcontrollers, digital signal processors, field-programmable gate arrays (FPGAs), custom semiconductors, and discrete circuitry.

The processor 270 may execute applications 224 stored in the storage unit 220. The applications 224 may include an application (hereinafter, "a conversation application") supporting a conversation between users. According to an embodiment, the processor 270 may include a content providing module 272 that performs a function of providing content on the basis of the context of the conversation that is being performed by the conversation application. The content providing module 272 may be referred to as "a CSMS module." Here, the content providing module 272 is an instruction set or codes stored in the storage unit 220, and may be a storage space in which instructions/codes at least temporarily resided in the processor 270, or may be a part of circuitry constituting the processor 270.

Figure 3:
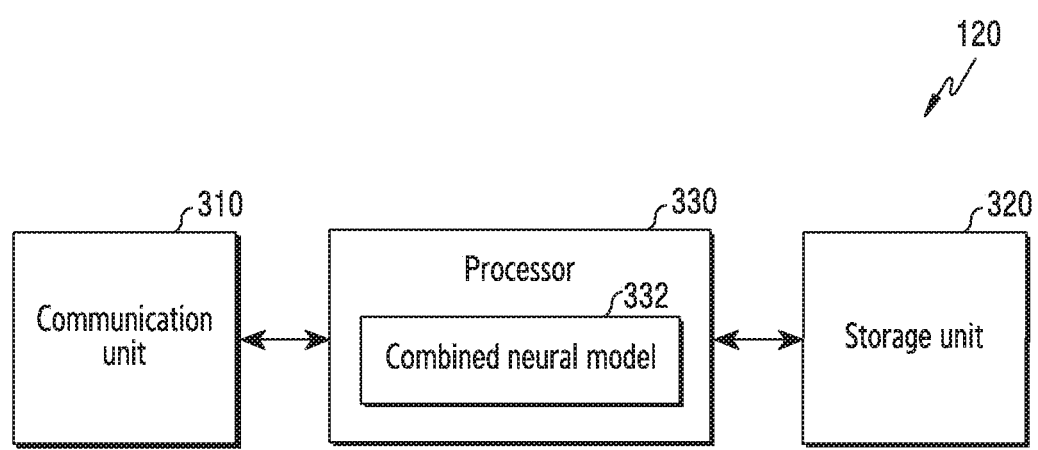
FIG. 3 illustrates a configuration of a server according to an embodiment of the disclosure.

FIG. 3 illustrates the configuration of a server according to an embodiment of the disclosure. The configuration illustrated in FIG. 3 may be understood as the configuration of the server 120. The term "~unit" or "~er" used hereinafter may refer to a unit for processing at least one function or operation and may be implemented in hardware, software, or a combination of hardware and software.

Referring to FIG. 3, the server includes a storage unit 320, a communication unit 310, and a processor 330.

The communication unit 310 provides an interface for communication with other systems or devices. For example, the communication unit 310 may include a network interface card or a wireless transmission/reception unit which enables communication via an external network (e.g., the network 130). The communication unit 310 may support communication via any suitable physical or wireless communication link(s). The communication unit 310 may be referred to as a "transmission unit," a "reception unit," or a "transmission/reception unit."

The storage unit 320 may store data, such as a basic program for operation of the server, an application, and setting information. The storage unit 320 may be configured as volatile memory, nonvolatile memory, or a combination of volatile memory and nonvolatile memory. The storage unit 320 may provide stored data in response to a request from the processor 330.

The processor 330 may control overall operations of the server. For example, the processor 330 may transmit and receive a signal through the communication unit 310. Further, the processor 330 may record and read data in the storage unit 320 and execute instructions stored in the storage unit 320. The processor 330 may include a single processor or a plurality thereof. For example, the processor 330 may be implemented as at least one among microprocessors, microcontrollers, digital signal processors, FPGAs, custom semiconductors, and discrete circuitry.

According to various embodiments, the processor 330 includes a combined neural model 332. The combined neural model 332 may be configured by a combination of different types of neural networks. At least one neural network determines whether the content should replace or complement a message. Further, different types of neural networks may calculate metric values of various types of multimedia that may be displayed in the same vector space. Here, the combined neural model 332 is an instruction set or codes stored in the storage unit 320, may be a storage space in which instructions/codes at least temporarily resided in the processor 330, or may be a part of circuitry constituting the processor 330.

A content search technique provided according to various embodiments may be based on an artificial intelligence (AI) system and an application thereof, the AI system simulating functions, such as recognition and judgment of the human brain, using a machine-learning algorithm, such as deep learning. Various embodiments are intended to provide a context-sensitive content search tool, particularly content suggestions, via electronic communication. The various embodiments presented may be utilized in all types of conversations, the messages of which a user desires to complement using a media item. Accordingly, a very powerful conversation, in other words, an enriched conversation, may be possible through the generation of a short and expressive message.

An existing system for searching requires a user to initiate a search and input a keyword. However, the system according to various embodiments may quietly analyze a conversation in the background and may propose related media content that can be added to the conversation, without forcing a user to perform an additional search.

Unlike other search systems, the search system according to various embodiments may be more suitable for interactive purposes than for the passive consumption of media. Conversations between different users may vary in terms of the emotional states thereof. Therefore, the search system according to various embodiments proposes media content based not only on general user preferences but also on the text of the conversation, so as to be media-context-applicable. The search system according to various embodiments may analyze the emotional state of a user and may react according thereto. Further, according to various embodiments, the search system may provide fresh and new content that is suitable for a user (tailored to the occasion) using a frequently updated database.

Figure 4:
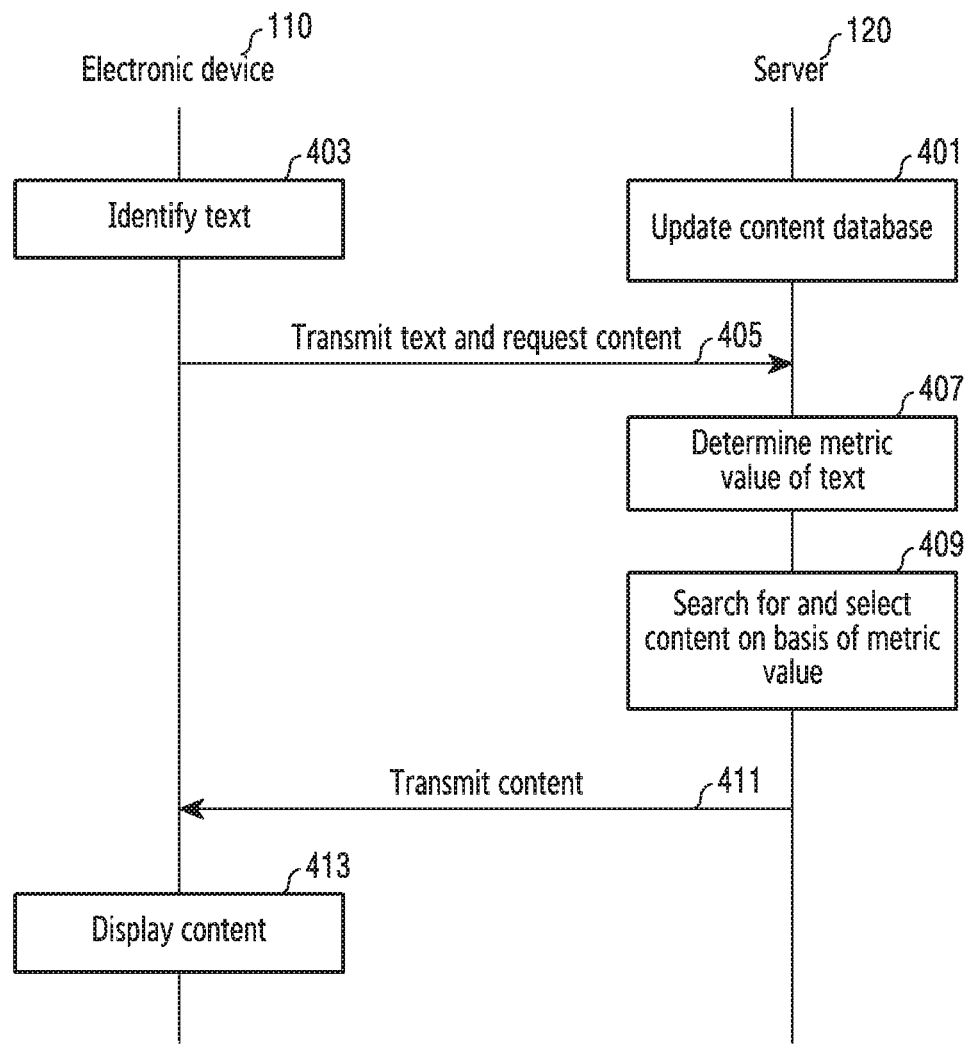
FIG. 4 illustrates a flow chart of content search according to an embodiment of the disclosure.

FIG. 4 illustrates a flow chart of content search according to an embodiment of the disclosure. FIG. 4 illustrates signal exchange between the server 120 and the electronic device 110.

Referring to FIG. 4, in operation 401, the server 120 updates a content database. The server 120 may update the database using various web sites accessible over the Internet. According to an embodiment, updating of the database may be periodically performed. Accordingly, the server 120 may continuously provide new content. Further, the server 120 may determine a metric value for the updated content. The metric value is normalized information for comparing the message with content, and may be determined using a neural network.

In operation 403, the electronic device 110 identifies text. For example, the electronic device 110 may identify text within a message typed by a user. In another example, the electronic device 110 may identify text within a message received from a conversation partner. That is, the text is extracted from the message that is received or is transmitted.

In operation 405, the electronic device 110 may transmit the text and a request for content to the server 120. For example, client SMS/messaging applications of the electronic device 110 transmit the text to the server 120, which is responsible for performing processing. The electronic device 110 may request the server 120 to search for content that matches the emotional state and the context and meaning of the text. In other words, the electronic device 110 transmits, to the server 120, text within a transmitted or received message, and requests content matching the text. To this end, a separate data format for text transmission and a content request may be defined. For example, the data format may include at least one of text, information indicating that content for the text has been requested, information indicating a desired content type, and additional information related to a user or the electronic device 110.

In operation 407, the server 120 determines a metric value of the text received from the electronic device 110. The server 120 determines a metric value indicating an emotional state and the context and meaning of the text. In order to determine the metric value, the server 120 may use a neural network. Here, it may be determined whether the requested content is a response to the message or a complement to the message. The metric value may have a vector form including a plurality of numerical vectors. The metric value may be referred to as a "representation."

In operation 409, the server 120 searches for and selects content matching the message on the basis of the metric value. The server 120 stores metric values of various types of content and stores metric values of respective pieces of content. Therefore, in order to search for matching content, the server 120 may compare, in operation 409, the generated metric values of the message with stored metric values of the content. When the metric values have a vector form, the server 120 may select content corresponding to a metric value having a minimum distance (e.g., a Euclidean distance) between vectors.

In operation 411, the server 120 transmits the content to the electronic device 110. Here, the server 120 may transmit a single piece of content or may transmit two or more pieces of content. When two or more pieces of content are transmitted, the electronic device 110 may select content therefrom. According to another embodiment, instead of the content, information for acquiring the content (e.g., a uniform resource locator (URL)) may be transmitted.

In operation 413, the electronic device 110 displays the content. For example, the electronic device 110 may display the content together with the message, or may display the content by replacing the message with the same. In another example, the electronic device 110 may configure new content by combining the content with the message, and may display the newly configured content.

In an embodiment described with reference to FIG. 4, the server 120 updates the database relating to the content in advance. However, according to another embodiment, the server 120 may receive a request for the content and then search for the content over the Internet. In this case, operation 401 may be omitted.

Further, in an embodiment described with reference to FIG. 4, a metric value for the message is determined by the server 120. However, according to another embodiment, the metric value for the message may be generated by the electronic device 110. In this case, operations 407 and 409 may be performed by the electronic device 110, and an operation of additionally transmitting a metric value may be further performed instead of an operation of transmitting the message in operation 405.

The metric value indicating the emotional state and the meaning of the text is generated as described above. Various embodiments adopt a metric value indicating an emotional state and the meaning of the text in the message. By using a metric value, a fast and efficient search is guaranteed, and the server may easily perform a content search matching an emotional state and the meaning of a message. For example, all words within the text are replaced by quantified vectors obtained during a training process. Thereafter, via a sequence of mathematical operations, the neural network may calculate a single vector from a sequence of word vectors. The single vector captures the meaning of a whole sentence, and is treated as a metric value of the sentence. Hereinafter, a more detailed embodiment relating to the determination of a metric value is described with reference to FIG. 5A and FIG. 5B.

Figure 5A:
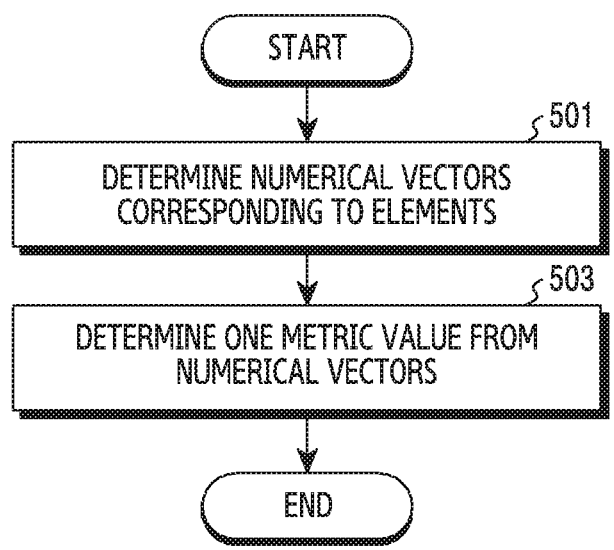
FIG. 5A illustrates a flow chart for determining a metric value according to an embodiment of the disclosure.
Figure 5B:
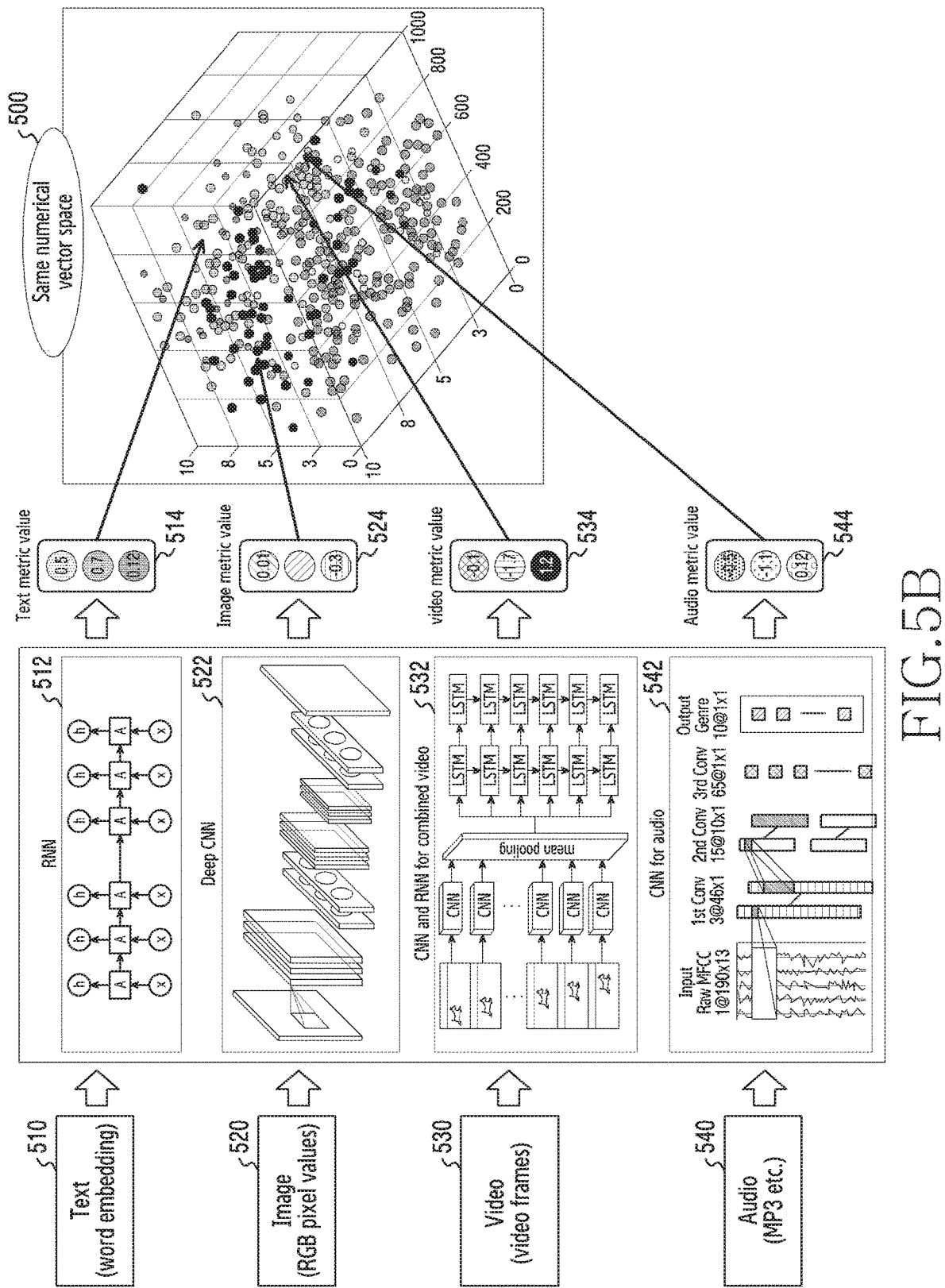
FIG. 5B illustrates an example of generating metric values of various types of contents according to an embodiment of the disclosure.

FIG. 5A illustrates a flow chart for determining a metric value according to an embodiment of the disclosure. FIG. 5A exemplifies a method for operating the server 120. However, according to various embodiments, the procedure of FIG. 5A may be understood to be the method for operating the electronic device 110. FIG. 5B illustrates an example of generating metric values of various types of contents according to an embodiment of the disclosure.

Referring to FIGS. 5A and 5B, in operation 501, a server may determine numerical vectors corresponding to elements of an object. Here, the object may be text received from an electronic device (e.g., the electronic device 110), or may be content stored in the database. For example, as illustrated in FIG. 5B, the object may be text 510, an image 520, a video file 530, or an audio file 540. Specifically, when the object is text 510, the server determines each sentence component, i.e., numerical vectors corresponding to respective words. The numerical vector may correspond to at least one among the meaning of a corresponding word and the relationship with the corresponding word and another word. In another example, when the object is the image 520, the server determines numerical vectors corresponding to respective pixels or pixel blocks. In still another example, when the object is the video file 530, the server determines numerical vectors corresponding to respective frames. Here, in order to determine numerical vectors corresponding to the respective frames, the server may determine numerical vectors corresponding to respective pixels within the frames and respective pixel blocks in advance. In another example, when the object is the audio file 540, the server may determine numerical vectors corresponding to respective pieces of data defined by partitioning audio according to specific criteria. For example, each piece of data may be defined by partitioning according to various criteria, such as a frequency axis and a time axis. A rule for converting an element into a numerical vector may be predefined, and furthermore may be updated via a training procedure. Here, it may be determined whether the requested content is a response to a message or a complement to the message.

In operation 503, the server determines a single metric value from numerical vectors. A metric value indicating an emotional state and the meaning of the object (e.g., text) may be derived on the basis of numerical vectors calculated from elements. The server converts the result of an analysis of the object into information of a type that can be compared with another content type. Specifically, the server may determine a single metric value by performing mathematical operations for numerical vectors. To this end, the server may process the message using the neural network. For example, at least one of a recurrent neural network (RNN) and a convolutional neural network (CNN) may be used as the neural network. For example, as illustrated in FIG. 5B, a metric value 514 of text 510 may be determined by an RNN 512, a metric value 524 of the image 520 may be determined by a deep CNN 522, and a metric value 534 of the video file 530 may be determined by an RNN 532 and a CNN for video, and a metric value 544 of the audio file 540 may be determined by a CNN 542 for audio.

As described with reference to FIG. 5A and FIG. 5B, the combined neural model used by the server may be configured as a combination of different types of neural networks. The different types of neural networks may calculate metric values of various types of multimedia that can be displayed in the same numerical vector space 500. The metric values of various types of content, which are calculated using the neural model, may be included in the same numerical vector space 500, and may be stored in the database of the server. The metric values of different types of content are present in the same numerical vector space 500, so that the similarity between the different types of content may be determined. Accordingly, the server may propose various types of content matching an emotional state and the meaning of the message text, and may easily compare and match the message with various types of content.

A metric value is determined from numerical vectors, as described with reference to FIG. 5A and FIG. 5B. The operation of determining a metric value from numerical vectors may be variously defined. According to an embodiment, the operation of determining a metric value may be defined using weight values. For example, metric values may be determined as in Equation 1.

$$h(t)=\tan h(w_1 \times v(t) + w_2 \times h(t-1)) \quad \text{Equation 1}$$

In Equation 1, h(t) is a hidden state in a t-th time step of the network, v(t) represents a numerical vector of a word in time step t, and $W_1$ and $W_2$ represent internal matrices of weight values.

An operation such as that of Equation 1 is repeated for a plurality of numerical vectors, and h(t), at which operations for all numerical vectors are completed, is determined as a metric value. That is, operations of Equation 1 are performed in each time step in a recurrent fashion. In other words, the output of one time step is used for calculation of another time step. A hidden vector, i.e., a hidden state, in a last state is treated as a metric value of an input (e.g., text).

According to various described embodiments, content matching the message may be retrieved using metric values of a plurality of candidate pieces of content. According to an embodiment, generated metric values of content may be grouped by latent semantic hashing (hereinafter, "LSH") in order to easily perform matching operations. The grouping and matching operations LSH may be performed as described in FIG. 6A and FIG. 6B.

Figure 6A:
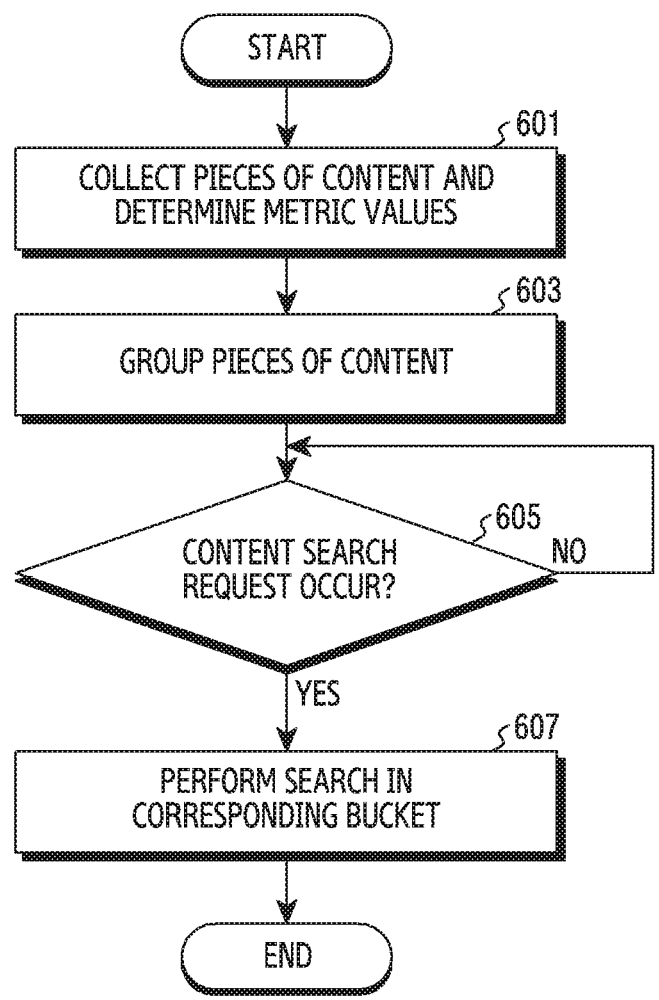
FIG. 6A illustrates flow chart for searching for grouped contents according to an embodiment of the disclosure.
Figure 6B:
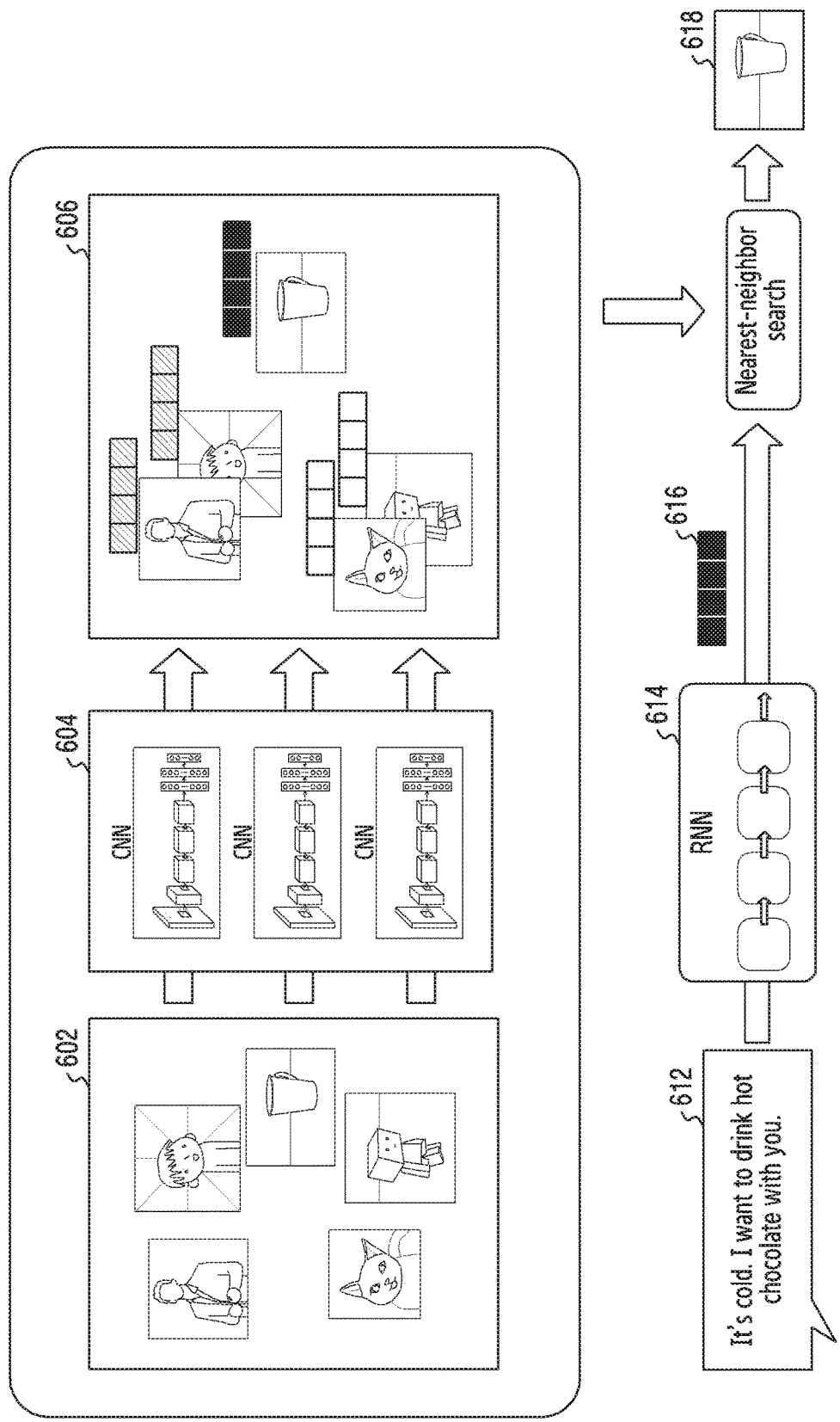
FIG. 6B illustrates an example of content grouping and content search according to an embodiment of the disclosure.

FIG. 6A illustrates a flow chart for searching for grouped content according to an embodiment of the disclosure. FIG. 6A exemplifies a method for operating the server 120. FIG. 6B illustrates an example of content grouping and content search according to an embodiment of the disclosure.

Referring to FIGS. 6A and 6B, in operation 601, the server collects content and generates metric values of the content. For example, as illustrated in FIG. 6B, after a plurality of pieces of content 602 is collected, metric values may be determined via a neural network 604 (e.g., CNN). Here, the neural network substantially establishes a graphic model of the metric values obtained from a large number of pieces of content.

In operation 603, the server groups the content. For example, the server may group the metric values on the basis of LSH. LSH is a technique of grouping, into buckets, points in a chosen space on the basis of a distance metric of each of the points. According to LSH, under the chosen metric, adjacent points are mapped to an identical bucket with a high probability. When LSH is applied to grouping of the content, points correspond to metric values (e.g., representation vectors) calculated with respect to a media item. According to LSH, the content within the database is grouped into buckets, and content having similar metric values may be included in the same bucket. That is, as illustrated in FIG. 6B, buckets 606 may be determined so that content having similar metric values is included in a single bucket.

In operation 605, the server determines whether a request for a content search occurs. The server determines whether a request for text and a request for text-related content are received from the electronic device. For example, as illustrated in FIG. 6B, text 612 may be received.

When a request for a content search occurs, the server searches a corresponding bucket in operation 607. To this end, the server may determine a metric value of the text, may select one bucket on the basis of the metric value, and may perform a search in the selected bucket. For example, as illustrated in FIG. 6B, a metric value 616 may be determined by a neural network 614 (e.g., RNN), and one piece of content 618 may be selected by performing a nearest-neighbor search with respect to the metric value 616. That is, input text triggers a search for content belonging to one bucket, and the one bucket may be determined by a hash function result for the input text.

Accordingly, the metric values of the content may be mapped to a vector space so that the metric values are located at addresses near semantically similar content through latent semantic hashing. The content to be searched for may be found simply by accessing all other content addresses that are semantically similar to the address of the content and differ only by a few bits. In other words, content having metric values, the LSH techniques of which are similar, is grouped into the same bucket, so that searching for one input is requested to be performed within only one bucket. Accordingly, objects to be searched may be reduced using an LSH technique. The LSH scheme, which expands the efficiency of corresponding coding, is faster and more efficient than a locality-sensitive hash.

Grouping performed according to LSH may facilitate a content search. For example, in the case of searching for content matching a message, a metric value may be determined through an analysis (e.g., an analysis using RNN) of the message. Thereafter, on the basis of grouping according to LSH, the server may perform a nearest-neighbor search with respect to the metric value so as to determine matching content.

According to various described embodiments, the similarity between different types of content may be determined using a metric value determined based on the neural network. Here, a parameter of the neural network may be updated by training the neural network. Hereinafter, an embodiment of neural network training will be described with reference to FIG. 7.

Figure 7:
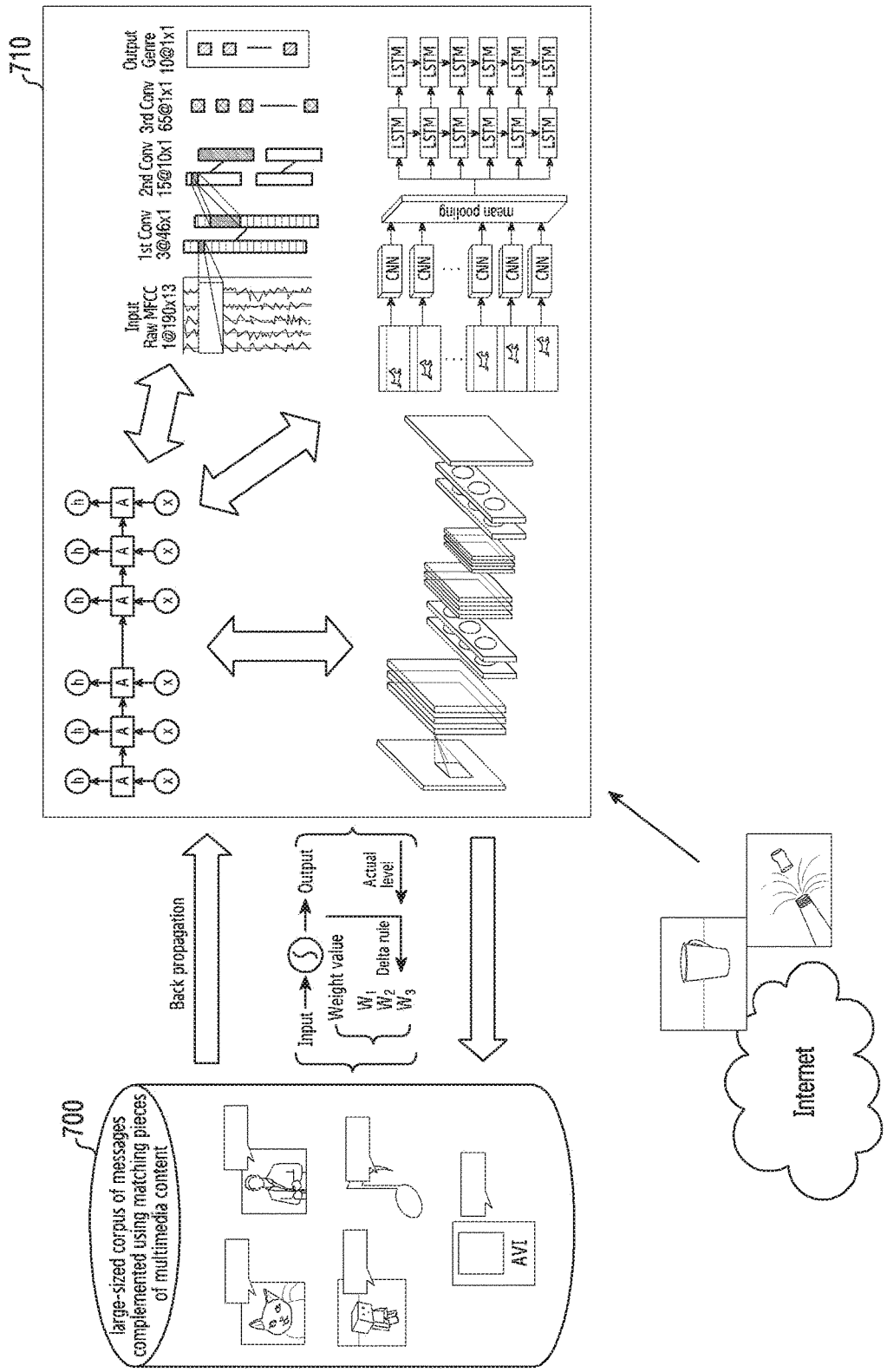
FIG. 7 illustrates a training procedure for a combined neural model according to an embodiment of the disclosure.

FIG. 7 illustrates a training procedure for a combined neural model according to an embodiment of the disclosure. FIG. 7 shows a training model corresponding to an end-to-end scheme, and describes an example of how a multimodal neural model can be jointly trained in the end-to-end scheme using a set of annotated multimodal data.

Referring to FIG. 7, messages annotated with matching content establish a large-sized corpus 700. Here, a combined neural model 710 that is combined by the annotated message may be trained through a back propagation procedure. In FIG. 7, weight values $W_1$, $W_2$, and $W_3$ are parameters of the neural network and are numerical matrix value used for internal calculations. The weight values may be updated by a back propagation algorithm. A delta rule is a rule for updating weight values in the back propagation algorithm. "Input" refers to text, and "output" refers to text processed by the back propagation algorithm. An actual label refers to an actual pair of multimodal data within annotated training data.

The delta rule may be determined based on gradients of a prediction error. The prediction error may be determined based on the difference between actual output and a target value (e.g., a square of a difference therebetween). The prediction error may be referred to as a "cost function."

The combined neural model 710 is configured as a combination of different types of neural networks. At least one neural network includes weight values as an element and processes data using the weight values. The at least one neural network multiplies content input data and weight values so as to create new signals and derives an output metric value by the sum of the new signals. Therefore, suitable weight value updating is necessary in order for the neural network to perform training for new data. Training includes updating the weight values, i.e., parameters configuring the neural network.

The combined neural model 710 may be trained in the end-to-end scheme through back propagation from the large-sized corpus 700 of messages complemented with matching content. Back propagation is a training algorithm used in the neural network, and the training method corresponds to supervising learning. In order to perform training, input data and desired output data are required. An output metric value, i.e., a result value of content input data, is obtained by repeating, multiple times, operations of multiplying and adding the input data and the weight values $W_1$, $W_2$, and $W_3$ of the neural network. Here, the output metric value may be different from the desired metric value given by the large-sized corpus 700 of messages complemented with matching content. The large-sized corpus 700 of messages complemented with matching content is data for which training has already been performed. As a result, an error between the output metric value and a desired metric value occurs in the neural network, and weight values are updated by the delta rule, which is a method for suitably updating the weight values in order to minimize the error. The direction of updating the weight values is opposite the direction of processing the neural network, by which updating the weight values is referred to as a back propagation algorithm. Thereby, metric values of contents, which are generated from different neural network structures and updated using the Internet, are automatically included in the same vector space. When training of the combined neural model 710 is properly performed, metric values of new and unknown content may be generated.

A training procedure based on the back propagation algorithm, as described in FIG. 7, may be performed in the following sequence. First, the neural network calculates scores for a message M and a content item I. Thereafter, gradients of a loss function J are calculated with respect to a network weight value W. The loss function is a function of measuring the difference between scores from an expected value with respect to a training pair and the network. This procedure may be expressed as the following Equation 2.

$$J=0.5\times(\text{scores}(M,I)-y)^2.$$

$$W_{grad}=\Delta J/\Delta W \quad \text{Equation 2}$$

In Equation 2, J refers to the loss function, M is a message, I is a medium item, and y is a variable set to 0 or 1, and a value is set to 1 in the case of a positive example of training data, and is set to 0 in the case of a negative example of the training data. $W_{grad}$ refers to the amount of change in a weight value.

Accordingly, model weight values are hereinafter updated according to Equation 3.

$$W_{new}=W_{old}-\alpha\times W_{grad} \quad \text{Equation 3}$$

In Equation 3, $W_{new}$ refers to a new weight value, $W_{old}$ refers to a previous weight value, α refers to a parameter for reflecting a learning rate, and $W_{grad}$ refers to the amount of change in the weight value.

According to this training procedure, the network weight values are modified so that a high score is assigned to a positive example and a low score is assigned to a negative example.

According to the described embodiments, on the basis of the neural network, metric values corresponding to the text or content may be generated, and content matching the meaning of the text may be retrieved on the basis of the metric values. Therefore, a user may experience a new messaging service by adding appropriate content to a message to be received or transmitted. The operations of an electronic device for providing this content search service are as follows.

Figure 8:
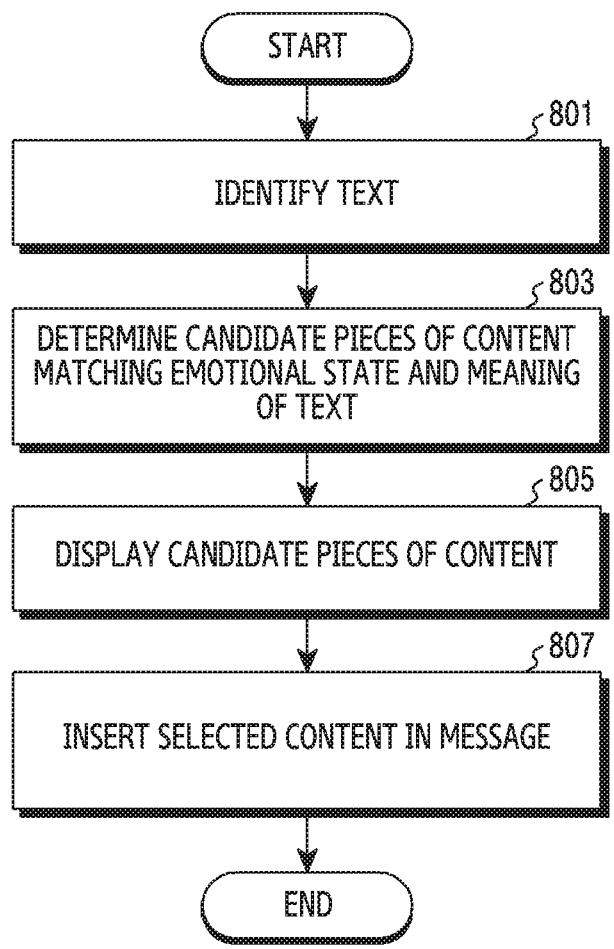
FIG. 8 illustrates a flow chart for providing a content by an electronic device according to an embodiment of the disclosure.

FIG. 8 illustrates a flow chart for providing content by an electronic device according to an embodiment of the disclosure. FIG. 8 exemplifies a method for operating the electronic device 110.

Referring to FIG. 8, in operation 801, the electronic device identifies text. For example, the text may be included in a message transmitted or received by a messaging application. The electronic device identifies text included in the message transmitted or received during an execution of the messaging application. Here, the text may be a part of the message, and the part of the message may be specified by a user input.

In operation 803, the electronic device determines candidate content mapping an emotional state and the context of the text. Specifically, the electronic device transmits information related to the text to an external server (e.g., the server 120) that performs a content search and receives information relating to candidate content from the external server. For example, the information related to the text may include the text itself or a metric value generated from the text.

In operation 805, the electronic device displays the candidate content. The candidate content may be classified according to type. The candidate content is displayed in the form of a thumbnail or preview, and may be displayed together with an interface for detection of user selection.

In operation 807, the electronic device inserts selected content into the message. Insertion of the content into the message includes at least one of adding the content as a part of the message, and generating the message configured by the content. The content itself may be inserted, or information (e.g., a URL) for acquisition of the content may be inserted.

According to an embodiment described with reference to FIG. 8, the electronic device may provide content relating to the text to a user. According to an embodiment, the text may be included in a transmitted or received message. In this case, a user may experience a more enriched messaging service. Hereinafter, more specific embodiments relating to a case of transmitting a message and a case of receiving the message are described.

Figure 9A:
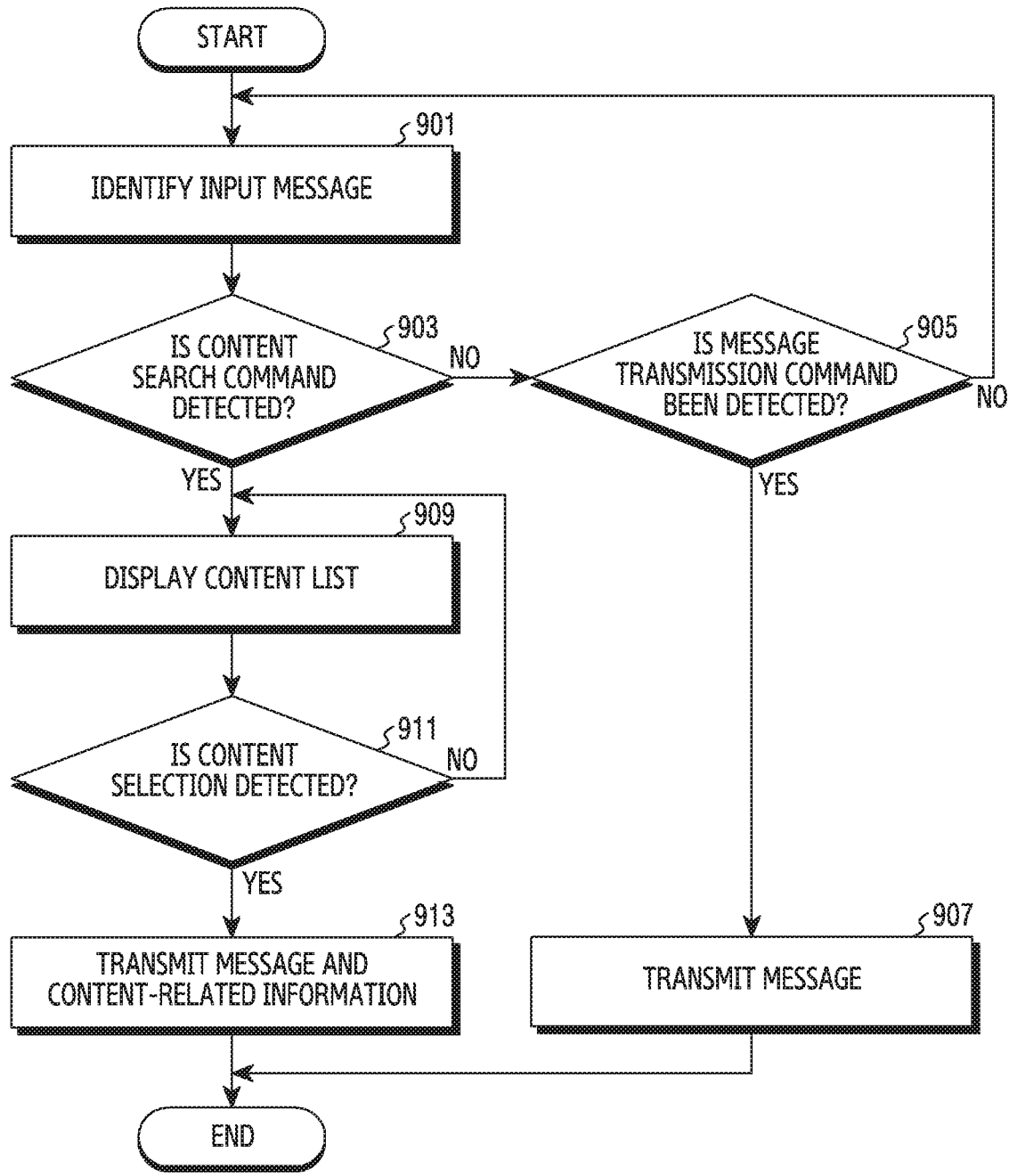
FIG. 9A illustrates a flow chart for providing a content corresponding to a message transmitted by an electronic device according to an embodiment of the disclosure.
Figure 9B:
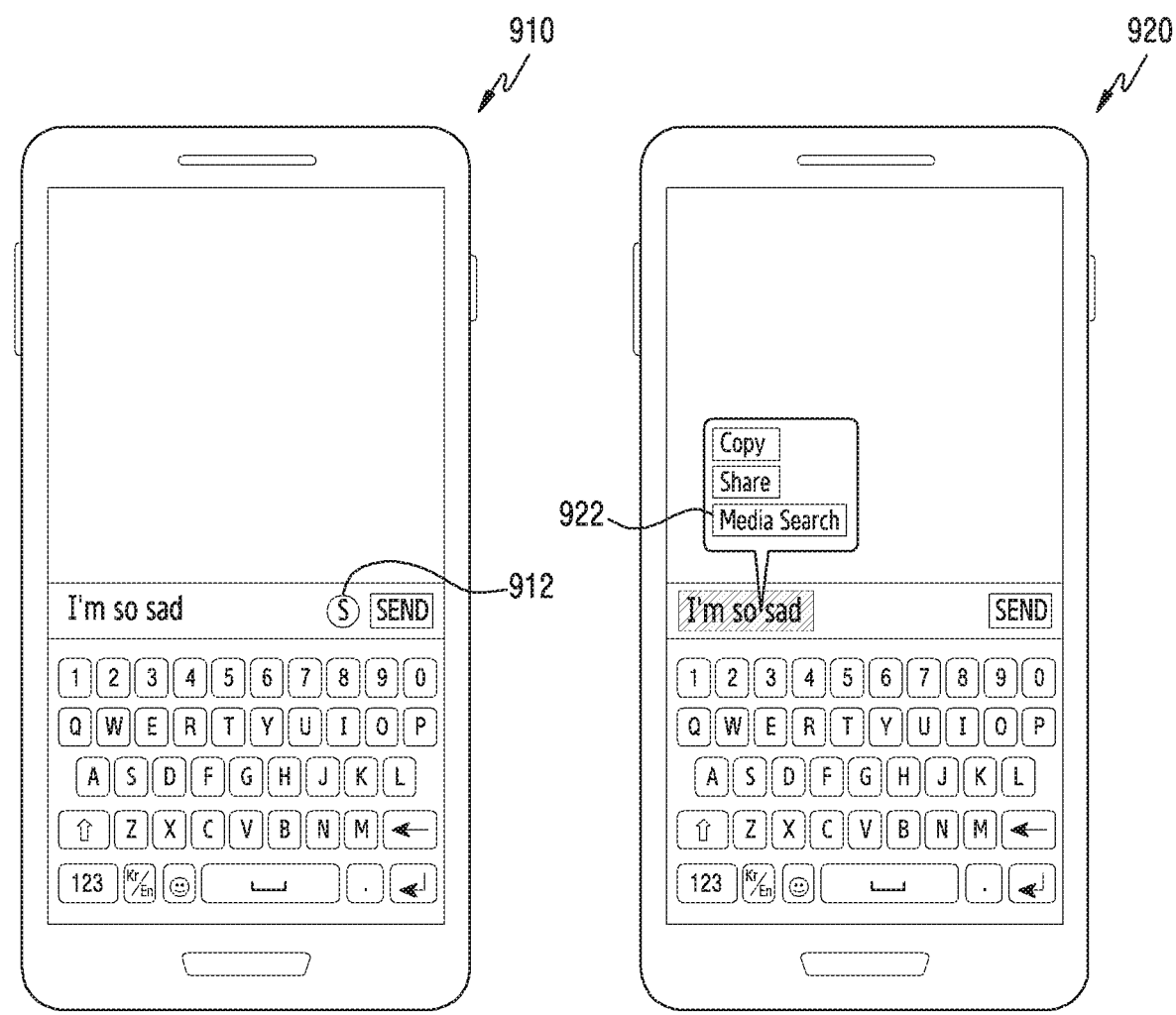
FIGS. 9B, 9C, 9D, and 9E illustrate examples of screens displayed by an electronic device that provides a content corresponding to a transmitted message according to an embodiment of the disclosure.
Figure 9C:
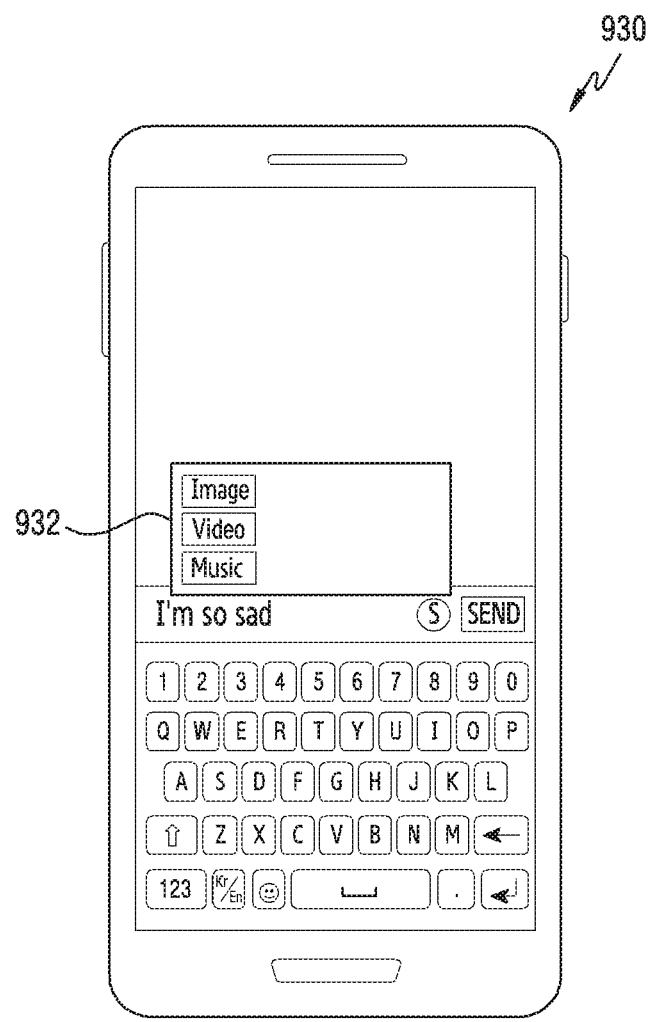
Figure 9D:
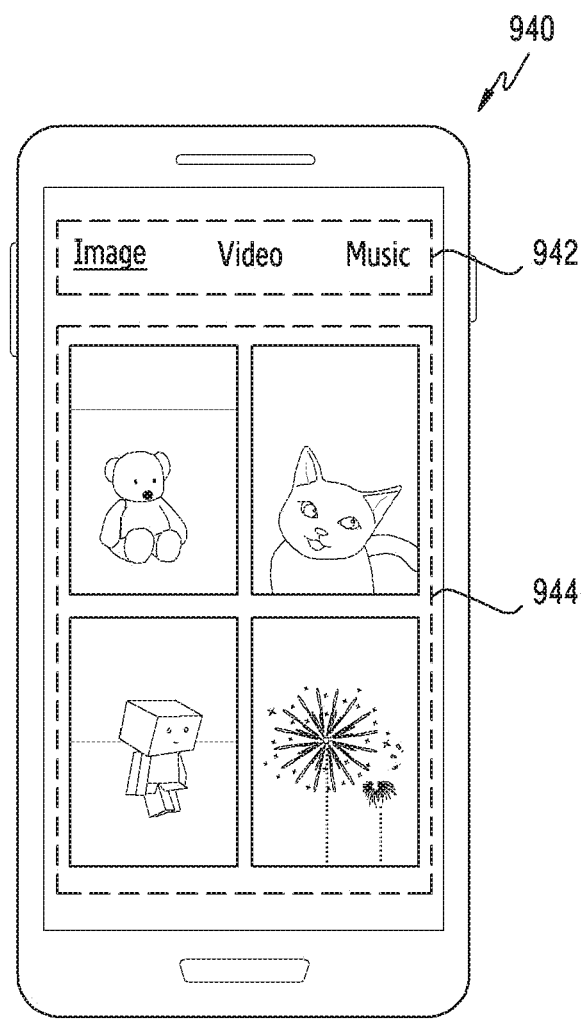
Figure 9E:
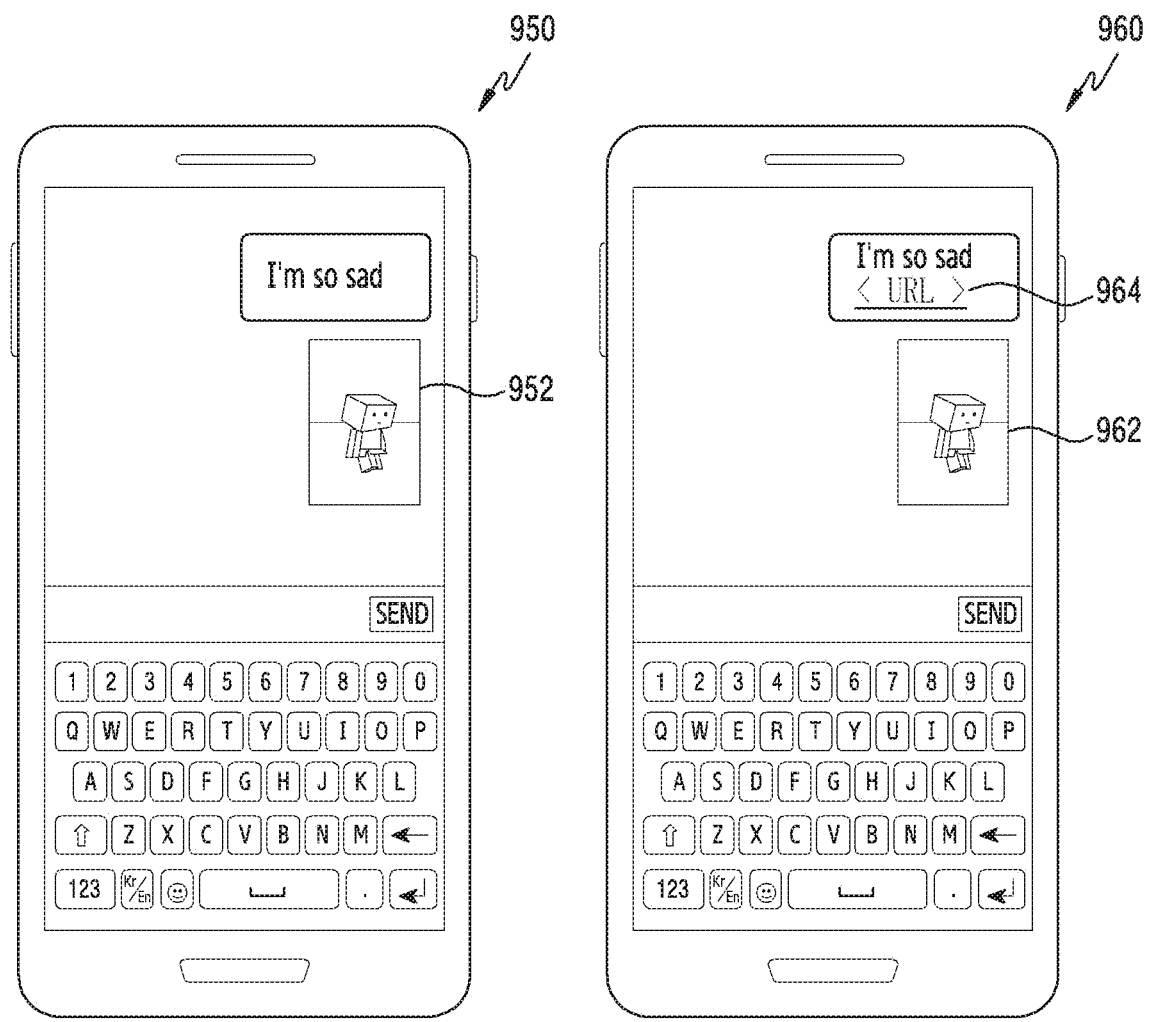

FIG. 9A illustrates a flow chart for providing content corresponding to a message transmitted by the electronic device according to an embodiment of the disclosure. FIG. 9A exemplifies a method for operating the electronic device 110. FIGS. 9B, 9C, 9D, and 9E illustrate examples of screens displayed by an electronic device that provides a content corresponding to a transmitted message according to an embodiment of the disclosure.

Referring to FIGS. 9A, 9B, 9C, 9D, and 9E, in operation 901, the electronic device identifies an input message. For example, a message may be input though keys displayed on a touch screen. That is, the electronic device may identifies a message input through an input means from a user during execution of a messaging application. The electronic device may display the message input from the user.

In operation 903, the electronic device determines whether a content search command is detected. The content search command may be variously defined. According to an embodiment, as shown in a screen 910 in FIG. 9B, the content search command may be defined as pressing of a button 912 (e.g., "S"), which has been defined for a content search. According to another embodiment, as shown in a screen 920 of FIG. 9B, the content search command may be defined by selecting an item 922 (e.g., "media search") for the content search command within a menu displayed by long pressing or selection of text.

If, the content search command is not sensed, the electronic device determines whether a message transmission command is detected in operation 905. When the message transmission command is detected without the content search command, the electronic device transmits the input message in operation 907. The electronic device transmits a message without a content search.

On the other hand, when the content search command is detected, the electronic device displays a list of content in operation 909. According to an embodiment, before displaying the list of content, the electronic device may display an interface requesting selection of a content type. For example, as shown in a screen 930 of FIG. 9C, a pop-up window 932 including a plurality of items ("image," "video," and "music") indicating content types may be displayed. The list of the content may include thumbnails or previews of a plurality of pieces of content. The list of the content may be classified according to content type. For example, as shown in a screen 940 of FIG. 9D, the list of the content may include an indication 942 of the content type and preview images 944 of the content. A user may change the types of content included in the list through the indication 942 of the content types. The electronic device may scroll through the list in response to swipe input by the user.

In operation 911, the electronic device may determine whether content selection is detected. That is, the electronic device determines whether one piece of content is selected in the displayed list. According to an embodiment, in response to the content selection, the electronic device may further display an interface (e.g., a pop-up window) for confirming the content selection.

In operation 913, the electronic device transmits information related to the message and the content. In response to the content selection, the electronic device transmits a message in which the content is inserted to a counterpart electronic device. The information relating to the content may include the content itself and the information (e.g., URL) for acquiring the content. Accordingly, the electronic device displays the message and the content. For example, as shown in a screen 950 in FIG. 9E, a transmission message and retrieved content 952 may be displayed. In another example, as shown in a screen 960 in FIG. 9E, the transmission message including a URL 964 of the retrieved message and retrieved content 962 may be displayed.

Figure 10A:
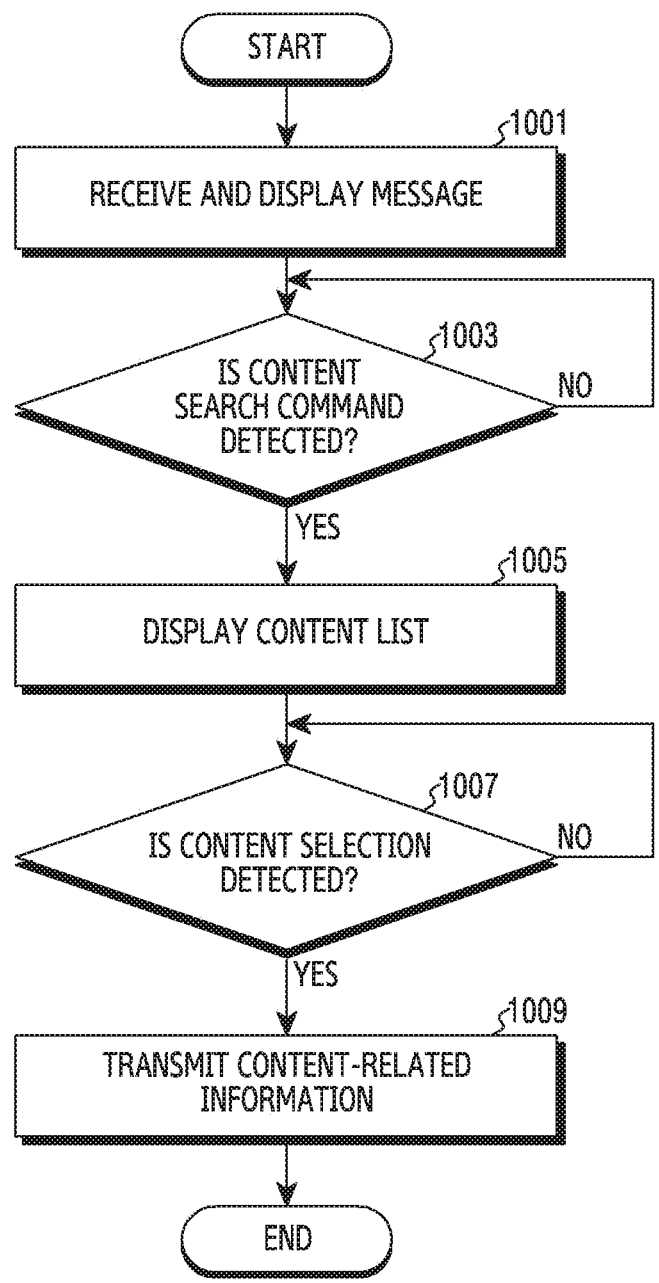
FIG. 10A illustrates a flow chart for providing a content corresponding to a message received by an electronic device according to an embodiment of the disclosure.
Figure 10B:
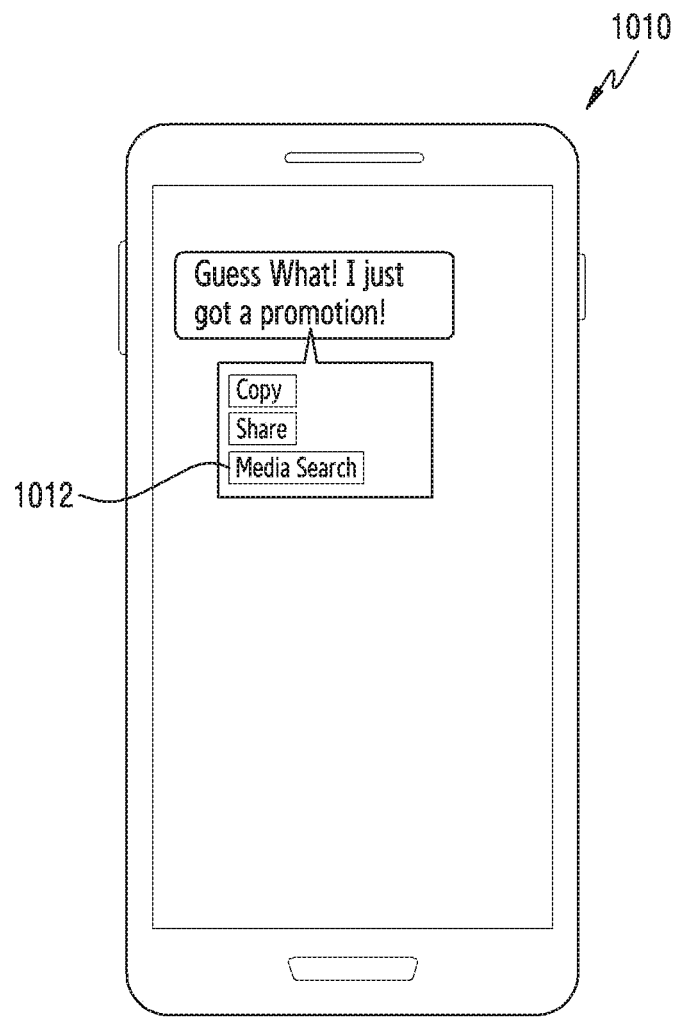
FIGS. 10B, 10C, 10D, and 10E illustrate examples of screens displayed by an electronic device that provides a content corresponding to a received message according to an embodiment of the disclosure.
Figure 10C:
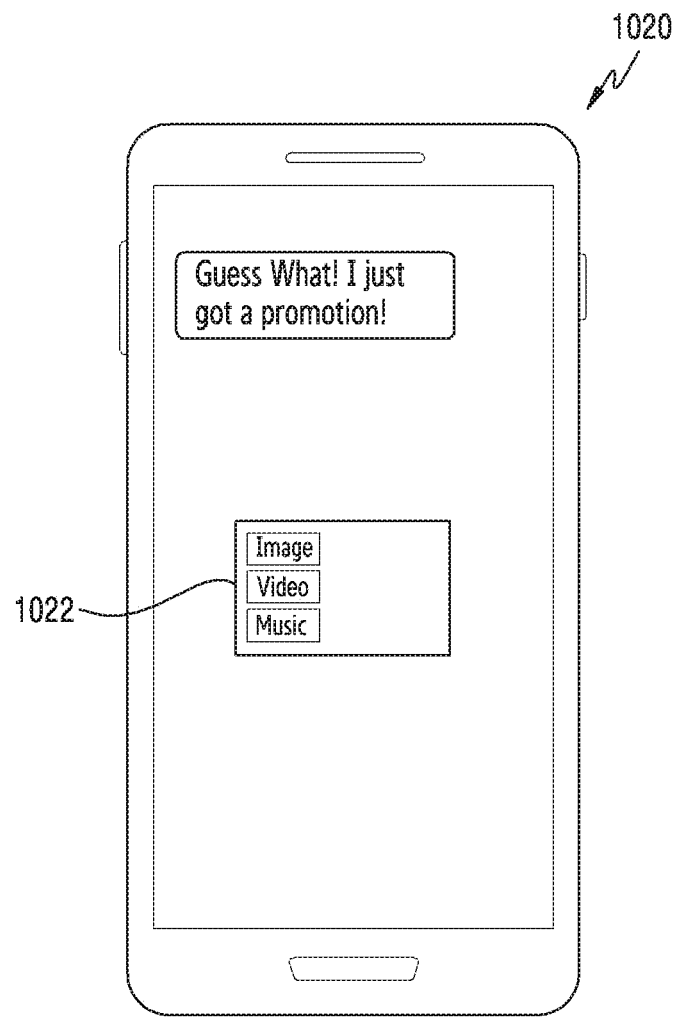
Figure 10D:
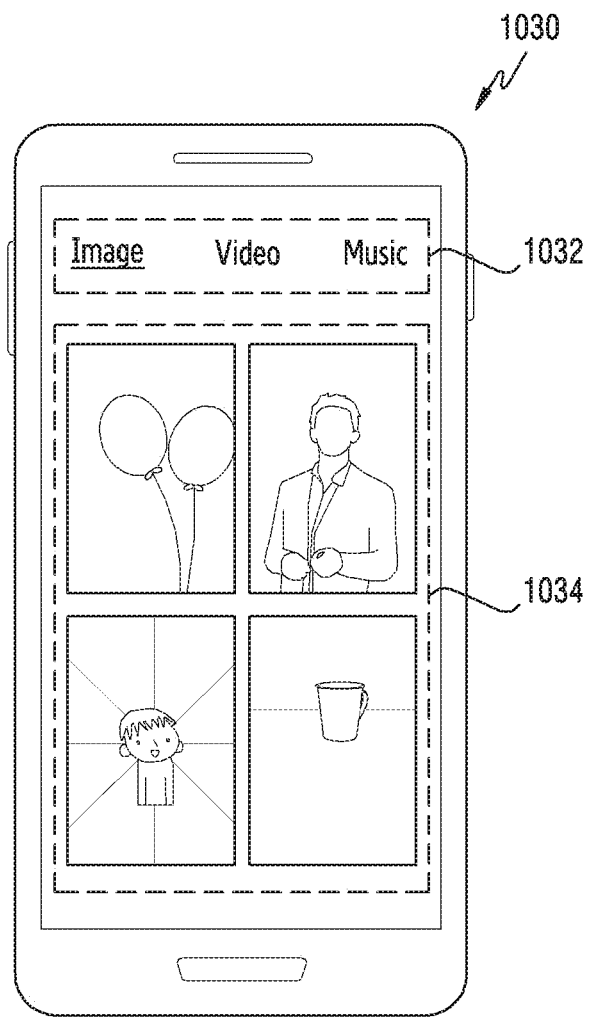
Figure 10E:
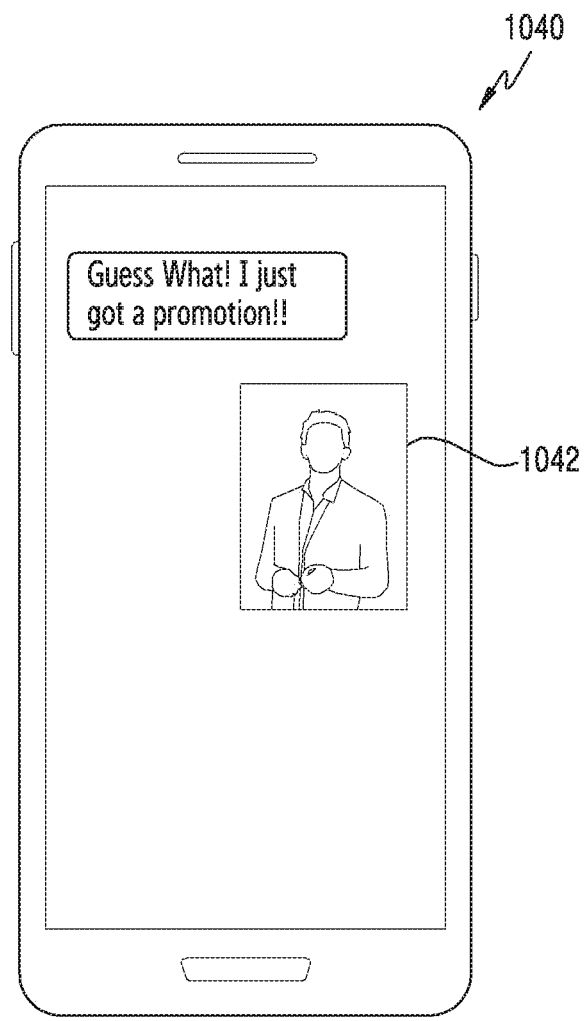

FIG. 10A illustrates a flow chart for providing content corresponding to a message received by the electronic device of the disclosure. FIG. 10A exemplifies a method for operating the electronic device 110. FIGS. 10B, 10C, 10D, and 10E illustrate examples of screens displayed by an electronic device that provides a content corresponding to a received message according to an embodiment of the disclosure.

Referring to FIGS. 10A, 10B, 10C, 10D, and 10E, in operation 1001, the electronic device receives and displays a message. The electronic device may display, on a display means, a message received from a counterpart electronic device during execution of the messaging application.

In operation 1003, the electronic device determines whether a content search command is detected. The content search command may be variously defined. According to an embodiment, as in a screen 1010 of FIG. 10B, the content search command may be defined by selecting an item 1012 (e.g., "media search") for the content search command within a menu displayed by selection and long-pressing of the text. In this case, the electronic device highlights a part of the text within a message in response to a drag by a user, displays a menu in response to long-pressing of the highlighted text, and identifies a selection of an item of the user.

In operation 1005, the electronic device displays a list of content. According to an embodiment, before displaying a list of content, the electronic device may display an interface requesting selection of a content type. For example, as shown in a screen 1020 of FIG. 10C, a pop-up window 1022 including a plurality of items (e.g., "image," "video," and "music") indicating content types may be displayed. The list of content may include thumbnails or previews of a plurality of pieces of content. The list of the content may be classified according to content type. For example, as shown in a screen 1030 of FIG. 10D, the list of contents may include a content type indication 1032 and preview images 1034 of the contents. A user may change the types of content included in the list through the content type indication 1032 of the content types.

In operation 1007, the electronic device may determine whether content selection is detected. That is, the electronic device determines whether or not one of the pieces of content included in the list of the content is selected. According to an embodiment, in response to content selection by the user, the electronic device may further display an interface (e.g., a pop-up window) for re-confirming the content selection.

In operation 1009, the electronic device transmits information related to the selected content. The electronic device may transmit information about the selected content to the counter party electronic device having transmitted the received message. The information related to the content may include the content itself or information (e.g., URL) for acquiring the content. According to another embodiment, the electronic device may display the selected content, instead of transmitting the information related to the selected content. As shown in a screen 1040 of FIG. 10E, a received message and retrieved content 1042 may be displayed.

The search system according to the various described embodiments processes a message in a text format. However, according to another embodiment, the search system may be expanded different types of input (for example, a voice message). The search system may be applied to a voice communicator and the like. For example, an external module may convert a voice message signal into a text format, and the search system may perform a media search according to context on the basis of the converted text. Further, the search system may propose an algorithm that directly functions on the voice message in real time. When an input, such as a voice message, is used, additional features, such as intonation or stress, may be utilized.

According to various embodiments of the disclosure, the search system may generate and update a user model on the basis of a user selection. The user model may re-determine a content search rank. Accordingly, the search system may perform a content search by applying user preferences. For example, the search system may preferentially search for content on another web site, instead of content on a single web site. The search system may preferentially search for content (e.g., photos, songs, video clips, or the like) of a specific type. The search system may match the content of the specific type with a specific emotion. For example, the search system may express joy by using an image of happy people, and may express love and tenderness using an image of a baby animal.

According to various embodiments of the disclosure, the search system may manually select a predefined category and may perform a content search on the basis of the user selection. For example, the predefined category may express most common emotions, such as joy, sadness, anger, and surprise. The search system may search for content by inputting a category name.

In various described embodiments, the search system searches for content on the basis of user input (e.g., a message). According to another embodiment, the content may be searched for on the basis of other additional information, in addition to the user input. Furthermore, the additional information may be used not only for a content search but also for content modification. An embodiment using additional information is described below with reference to FIG. 11.

Figure 11:
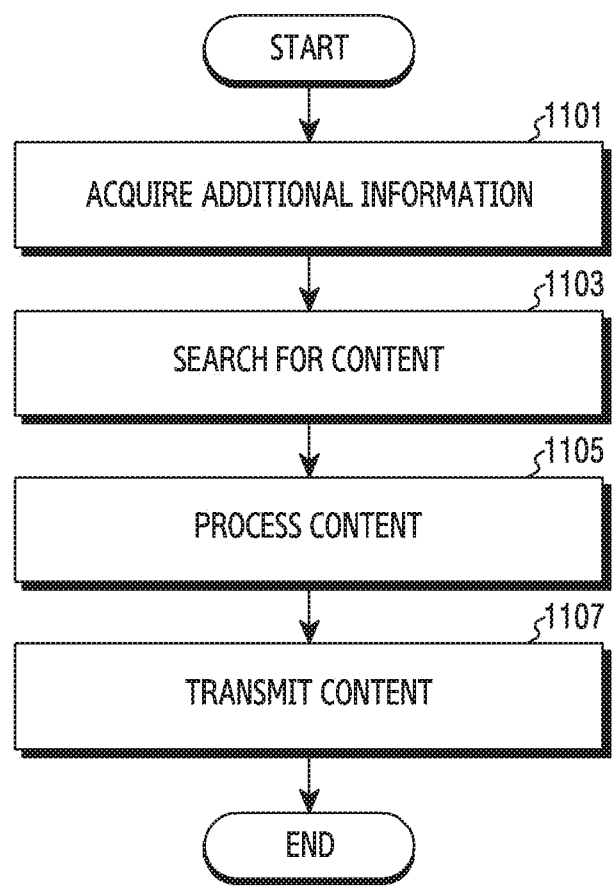
FIG. 11 illustrates a flow chart for searching for and processing a content on the basis of additional information by a server according to an embodiment of the disclosure.

FIG. 11 illustrates a flow chart for searching for and processing content on the basis of additional information by the server according to an embodiment of the disclosure. FIG. 11 exemplifies a method for operating the server 120.

Referring to FIG. 11, in operation 1101, a server acquires additional information. The additional information represents information other than a message (e.g., a text message), which is the main criterion of the content search and is provided from the electronic device (e.g., the electronic device 110). For example, the additional information may include at least one among user biometric information, location information of the electronic device, time information, sensing information measured by a sensor, user subscription information (e.g., a level), information of an electronic device model, and hardware capability information of the electronic device. The additional information may be received together with a content request received from the electronic device, may be received from a management server that manages subscriber information, or may be generated inside the server.

In operation 1103, the server searches for content. To this end, the server may determine a metric value of text included in a message, and may compare the metric value of text with metric values of content stored in a database. According to various embodiments, the server may search for content on the basis of additional information. According to an embodiment, the server may determine a metric value by further considering the additional information. That is, the server may convert the additional information into text, and may determine metric values corresponding both to the text included in the message and to the text generated from the additional information. According to another embodiment, the server may limit a search range on the basis of the additional information. In other words, the server may determine a content pool for searching on the basis of the additional information. Specifically, the content stored in the database may be classified into a plurality of groups, and each group may be set to be selectively available according to various types of additional information, such as a time zone, a location, a user level, and a hardware capability of an electronic device.

In operation 1105, the server processes the content. For example, the server may process the content in a format appropriate for the hardware capability of the electronic device, a running application, and the like. Here, the appropriate form represents a state in which the content can be displayed or reproduced under a condition specified by the additional information (e.g., resolution, codec, allowed type, etc.), or a state preferred by a user. For example, the server may change at least one of a resolution, a codec, and a type of the content, or may combine two or more pieces of content.

In operation 1107, the server transmits the content. According to another embodiment, instead of the content, information (e.g., a URL) for acquisition of the content may be transmitted.

In an embodiment described with reference to FIG. 11, the server processes and then transmits the content. When a plurality of pieces of content is retrieved, the server may process all retrieved content or may process a single piece of content selected by a user. When processing only a single piece of content selected by the user, the server may transmit content, may receive feedback information indicating user selection, and may then process the content indicated by the feedback information.

According to another embodiment, the electronic device may perform content processing. In this case, the server may transmit the content without processing the content, and the electronic device having received the content may process the content. According to another embodiment, operation 1105 for content processing may be performed neither by the electronic device nor by the server.

In an embodiment described with reference to FIG. 11, the server may search for content on the basis of additional information. A specific operation for a content search on the basis of the additional information may vary depending on the type of the additional information.

For example, when time information is used, the server may identify the time zone to which the current time belongs, and may perform a search within a group corresponding to the identified time zone. That is, the available content may vary depending on the time zone, and a user may use content available in a time zone corresponding to the current time.

In another example, when a user level is used, the server queries about a user level to a management server, and may perform a search within at least one group allowed according to the user level. Therefore, a content search service differentiated according to a user level may be provided.

According to the various described embodiments, content matching a message and the like may be provided. Among various embodiments for the described content search, an embodiment in which the content is limited depending on the additional information may be applied to the use of an emoticon during conversation through a messaging application. For example, available emoticons may be limited according to the user level. For determination of a list of emoticons, if the meaning of text included in the message is considered, the use of emoticons may be treated similar to the content search according to the various described embodiments.

Figure 12:
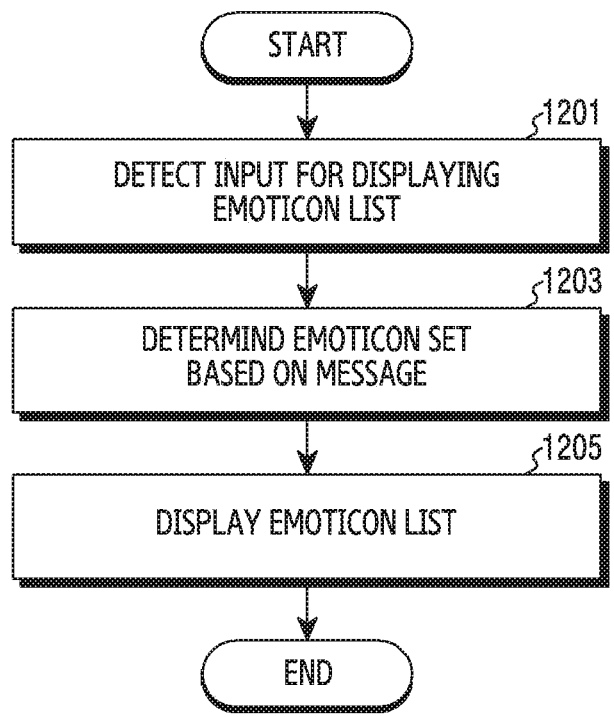
FIG. 12 illustrates a flow chart for searching for and processing content on the basis of additional information by a server according to an embodiment of the disclosure.

FIG. 12 illustrates a flow chart for searching for and processing content on the basis of additional information by an electronic device according to an embodiment of the disclosure. FIG. 12 exemplifies a method for operating the electronic device 110.

Referring to FIG. 12, in operation 1201, the electronic device detects an input for displaying an emoticon list. During a messaging application being running, the electronic device may detect the input from the user. For example, the input includes a touch input on an item (e.g., an icon) related to emoticons.

In operation 1203, the electronic device determines a set of emoticons to be displayed based on a message. For example, the message is one of messages that are received or transmitted by the messaging application, e.g., recently received or transmitted message. The information of the set of emoticons may include at least one of at least one image of at least one emoticon, at least one identification of the at least one emoticon, and information for downloading the at least one emoticon. For doing this, the electronic device may transmit text of the message to a server and may receive the information of the set of emoticons. The server may determine a metric value of the text and select the set of emoticons according to the aforementioned various embodiments. Further, in another embodiment, the server may consider additional information, such as a time zone, a location, a user level, and a hardware capability of an electronic device.

In operation 1205, the electronic device displays the emoticon list. That is, the electronic device displays items representing the set of emoticons that is determined based on the message. The set of emoticons may be a part of whole emoticon stored in the electronic device. Thereafter, the electronic device may transmit an emoticon in response detecting an input on an item of the items.

Methods according to embodiments stated in claims and/or specifications of the disclosure may be implemented in hardware, software, or a combination of hardware and software.

When the methods are implemented in software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memory including random access memory and flash memory, read-only memory (ROM), electrically erasable programmable read-only memory (EEPROM), a magnetic disc storage device, a compact disc-ROM (CD-ROM), digital versatile discs (DVDs), or other types of optical storage devices, or a magnetic cassette. Alternatively, any combination of some or all thereof may form memory in which the program is stored. Further, a plurality of such memories may be included in the electronic device.

In addition, the programs may be stored in an attachable storage device which is accessible through communication networks such as the Internet, Intranet, a LAN, a WAN, a storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to the presented detailed embodiment. However, the singular form or plural form is selected for convenience of description suitable for the presented situation, and various embodiments of the disclosure are not limited to a single element or multiple elements thereof. Further, multiple elements expressed in the description may be combined into a single element, or a single element in the description may be configured as multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a server configured to search for content, the method comprising:
   receiving, from an electronic device, a text that is extracted from a message transmitted or received by a messaging application at the electronic device;
   determining one metric value corresponding to the text from numerical vectors corresponding to meanings of words included in the text;
   selecting one piece of content corresponding to the text, based on metric values of a plurality of pieces of content and the determined one metric value; and
   transmitting information related to the one piece of content to the electronic device.

2. The method of claim 1,
wherein the determined one metric value indicates an emotional state of the text and a context and meaning of the text, and
wherein the determined one metric value is derived by the server based on the numerical vectors that are calculated from elements.

3. The method of claim 1, further comprising:
grouping the plurality of pieces of content into a plurality of buckets, based on the metric values of the plurality of pieces of content; and
selecting the one piece of content corresponding to the text based on a result of comparing the determined one metric value of the text with a metric value of at least one piece of content within a bucket corresponding to the determined one metric value of the text.

4. The method of claim 1, further comprising:
collecting the plurality of pieces of content; and
determining the metric values of the plurality of pieces of content.

5. The method of claim 4, wherein the determining of the metric values of the plurality of pieces of content comprises:
for image-type content, determining numerical vectors corresponding to respective pixels or respective pixel blocks of an image;
for video-type content, determining numerical vectors corresponding to respective video frames; and
for audio-type content, determining numerical vectors corresponding to respective pieces of data defined by partitioning audio according to specific criteria.

6. The method of claim 1, further comprising:
determining a content pool for a search, based on additional information related to the electronic device,
wherein the additional information includes at least one of biometric information of a user of the electronic device, location information of the electronic device, time information, sensing information measured by a sensor, subscriber information of the user, information of an application running on the electronic device, a device type of the electronic device, information of a model of the electronic device, or hardware capability information of the electronic device.

7. The method of claim 1, wherein the determining of the one metric value comprises:
determining the one metric value based on additional information related to the electronic device and the numerical vectors,
wherein the additional information includes at least one of biometric information of a user of the electronic device, location information of the electronic device, time information, sensing information measured by a sensor, subscriber information of the user, information of an application running on the electronic device, a device type of the electronic device, information of a model of the electronic device, or hardware capability information of the electronic device.

8. A method for operating an electronic device, the method comprising:
transmitting, to a server, information of a text that is extracted from a message transmitted or received by a messaging application;
receiving, from the server, information related to at least one piece of content corresponding to the text, the information related to the at least one piece of content being searched for by the server based on metric values of a plurality of pieces of content and one metric value determined from numerical vectors corresponding to meanings of words included in a specific text of the text; and
displaying the at least one piece of content.

9. The method of claim 8, further comprising displaying an interface configured to inquire about types of content to be searched.

10. The method of claim 8, wherein the information of the text includes at least one of the text or the determined one metric value of the text.

11. The method of claim 8, further comprising:
displaying a received message;
displaying an item for a search command in response to a request by a user, the search command being related to at least a part of text included in the received message;
in response to a selection of the item, displaying an interface configured to inquire about a content type; and
in response to selecting the content type by the user, displaying candidate content of the selected content type.

12. The method of claim 8, further comprising:
displaying a transmission message that is input to be transmitted;
when a search command for content corresponding to at least a part of the text included in the transmission message is detected, displaying an interface configured to inquire about a content type; and
in response to a selection of the content type by a user, displaying candidate content of the selected content type.

13. The method of claim 8, further comprising:
transmitting additional information related to the electronic device,
wherein the additional information includes at least one of biometric information of a user of the electronic device, location information of the electronic device, time information, sensing information measured by a sensor, subscriber information of the user, information of an application running on the electronic device, a device type of the electronic device, information of a model of the electronic device, or hardware capability information of the electronic device.

14. A server for searching for content, the server comprising:
a communicator configured to transmit and receive a signal; and
at least one processor connected to the communicator,
wherein the at least one processor is configured to:
receive, from an electronic device, a text that is extracted from a message transmitted or received by a messaging application at the electronic device,
determine one metric value corresponding to the text from numerical vectors corresponding to meanings of words included in the text,
select one piece of content corresponding to the text, based on metric values of a plurality of pieces of content and the determined one metric value, and
transmit information related to the one piece of content to the electronic device.

15. The server of claim 14,
wherein the determined one metric value indicates an emotional state of the text and a context and meaning of the text, and wherein the determined one metric value is derived by the server based on the numerical vectors that are calculated from elements.

16. The server of claim 14, wherein the at least one processor is further configured to:
   group the plurality of pieces of content into a plurality of buckets, based on the metric values of the plurality of pieces of content, and
   select the one piece of content corresponding to the text based on a result of comparing the determined one metric value of the text with a metric value of at least one piece of content within a bucket corresponding to the determined one metric value of the text.

17. The server of claim 14, wherein the at least one processor is further configured to:
   collect the plurality of pieces of content, and
   determine the metric values of the plurality of pieces of content.

18. The server of claim 17, wherein the at least one processor is further configured to:
   for image-type content, determine numerical vectors corresponding to respective pixels or respective pixel blocks of an image,
   for video-type content, determine numerical vectors corresponding to respective video frames, and
   for audio-type content, determine numerical vectors corresponding to respective pieces of data defined by partitioning audio according to specific criteria.

19. The server of claim 14,
wherein the at least one processor is further configured to determine a content pool for a search, based on additional information related to the electronic device, and
wherein the additional information includes at least one of biometric information of a user of the electronic device, location information of the electronic device, time information, sensing information measured by a sensor, subscriber information of the user, information of an application running on the electronic device, a device type of the electronic device, information of a model of the electronic device, or hardware capability information of the electronic device.

20. The server of claim 14,
wherein the at least one processor is further configured to determine the one metric value, based on the numerical vectors and additional information related to the electronic device, and
wherein the additional information includes at least one of biometric information of a user of the electronic device, location information of the electronic device, time information, sensing information measured by a sensor, subscriber information of the user, information of an application running on the electronic device, a device type of the electronic device, information of a model of the electronic device, or hardware capability information of the electronic device.

* * * * *